(12) United States Patent
Nygren et al.

(10) Patent No.: US 11,035,786 B2
(45) Date of Patent: Jun. 15, 2021

(54) INFRARED SENSOR ARRAY WITH SENSORS CONFIGURED FOR DIFFERENT SPECTRAL RESPONSES

(71) Applicant: FLIR Systems AB, Täby (SE)

(72) Inventors: Hakan E. Nygren, Upplands Vasby (SE); Eric A. Kurth, Santa Barbara, CA (US); Jonas Sandsten, Lomma (SE)

(73) Assignee: FLIR Systems AB, Taby (SE)

( * ) Notice: Subject to any disclaimer, the term of this patent is extended or adjusted under 35 U.S.C. 154(b) by 0 days.

(21) Appl. No.: 16/905,871

(22) Filed: Jun. 18, 2020

(65) Prior Publication Data
US 2020/0319097 A1 Oct. 8, 2020

Related U.S. Application Data

(63) Continuation of application No. PCT/US2018/067834, filed on Dec. 28, 2018.
(Continued)

(51) Int. Cl.
*G01N 21/3504* (2014.01)
*G01J 5/24* (2006.01)
*G01J 5/26* (2006.01)

(52) U.S. Cl.
CPC ............ *G01N 21/3504* (2013.01); *G01J 5/24* (2013.01); *G01J 5/26* (2013.01); *G01N 2021/3531* (2013.01)

(58) Field of Classification Search
CPC ........ G01N 21/3504; G01N 2021/3531; G01J 5/24; G01J 5/26; G01J 2005/0077;
(Continued)

(56) References Cited

U.S. PATENT DOCUMENTS 6,495,829 B1 12/2002 Oda
9,404,804 B1* 8/2016 Liu .................. G01J 5/046
(Continued)

OTHER PUBLICATIONS

Murphy et al. ("Multi-spectral Uncooled Microbolometer Sensor for the Mars 2001 Orbiter THEMIS Instrument", 2000 IEEE Aerospace Conference in Big Sky, Montana (Mar. 18-26, 2000) pp. 1-13 (Year: 2000).*
(Continued)

*Primary Examiner* — David P Porta
*Assistant Examiner* — Meenakshi S Sahu
(74) *Attorney, Agent, or Firm* — Haynes and Boone, LLP

(57) ABSTRACT

Improved techniques for infrared imaging and gas detection are provided. In one example, a system includes a sensor array configured to receive infrared radiation from a scene comprising a background portion and a gas. The sensor array includes a first set of infrared sensors configured with a first spectral response corresponding to a first wavelength range of the infrared radiation associated with the background portion. The sensor array also includes a second set of infrared sensors configured with a second spectral response corresponding to a second wavelength range of the infrared radiation associated with the gas. The system also includes a read out integrated circuit (ROIC) configured to provide pixel values for first and second images captured by the first and second sets of infrared sensors, respectively, in response to the received infrared radiation. Additional systems and methods are also provided.

17 Claims, 18 Drawing Sheets

Related U.S. Application Data

(60) Provisional application No. 62/612,272, filed on Dec. 29, 2017.

(58) Field of Classification Search
CPC .. G01J 5/602; G01J 5/20; G01J 5/0014; G01J 3/36; G01J 5/0853; H04N 5/332
See application file for complete search history.

(56) References Cited

U.S. PATENT DOCUMENTS

| | | |
|---|---|---|
| 2007/0176104 A1 | 8/2007 | Geneczko et al. |
| 2011/0176048 A1 | 7/2011 | Rockley |

OTHER PUBLICATIONS

Maier T et al., "Wavelength-tunable Microbolometers with metamaterial absorbers", Optics Letters Optical Society of America, Oct. 1, 2009, pp. 3012-3014.

* cited by examiner

INFRARED SENSOR ARRAY WITH SENSORS CONFIGURED FOR DIFFERENT SPECTRAL RESPONSES

CROSS-REFERENCE TO RELATED APPLICATIONS

This application is a continuation of International Patent Application No. PCT/US2018/067834 filed Dec. 28, 2018 and entitled "INFRARED SENSOR ARRAY WITH SENSORS CONFIGURED FOR DIFFERENT SPECTRAL RESPONSES," which is incorporated herein by reference in its entirety.

International Patent Application No. PCT/US2018/067834 filed Dec. 28, 2018 claims priority to and the benefit of U.S. Provisional Patent Application No. 62/612,272 filed Dec. 29, 2017 and entitled "INFRARED SENSOR ARRAY WITH SENSORS CONFIGURED FOR DIFFERENT SPECTRAL RESPONSES," which is hereby incorporated by reference in its entirety.

TECHNICAL FIELD

The present invention relates generally to infrared imaging and, more particularly, to gas detection using thermal images.

BACKGROUND

In the field of optical gas imaging (OGI), various techniques are employed to detect the presence gases. For example, specific gases may emit and/or absorb infrared (e.g. thermal) radiation in characteristic ways at particular wavelengths. Images may be captured of a scene and analyzed to determine the presence or absence of radiation at certain wavelengths. By comparing these wavelengths to the wavelengths associated with known gases, the presence of a particular gas of interest may be determined.

When a scene is imaged in accordance with such techniques, it is generally preferred to remove the background radiation that is not associated with the gas of interest. In some cases, this may be performed without filtering. For example, certain operations may be employed to subtract sequentially captured images and detect the presence of a gas based on small frame-to-frame changes. Unfortunately, such subtraction may remove a disproportionally large portion of the image associated with the gas and cannot be used for quantification.

Other techniques rely on filtering. For example, infrared radiation from a target scene may be provided to separate sensor arrays. This approach permits the sensor arrays to be filtered differently and the integration periods of the sensor arrays may be independently calibrated such that the resulting images from the different sensor arrays are balanced with each other. Unfortunately, such an approach may exhibit parallax among the images captured by the differently positioned sensor arrays. Although a beam splitter may be used in some cases to pass the infrared radiation to the sensor arrays to reduce parallax, such arrangements nevertheless require precise alignment among the various components to avoid faulty images caused by, for example, vibration of the system components, time misalignment of the images captured by the different arrays, and other factors.

As a result, many existing systems are generally costly, require high power, and are relatively large and heavy to implement. Moreover, many such systems may further rely on expensive cooled detectors that add further cost and complexity. Thus, there is a need for an improved approach to thermal imaging that permits reliable capture of multiple images of a target scene to permit accurate and reliable gas detection.

SUMMARY

Improved techniques for infrared (e.g., thermal) imaging and gas detection are provided. Various sets of infrared sensors (e.g., detectors) of a single focal plane array (FPA) may be configured with different spectral responses. As a result, different sets of infrared sensors may respond differently to the same incident infrared radiation received from a scene. Accordingly, different images may be captured that are responsive to different wavelengths (e.g., different wavelength ranges corresponding to different wavebands). Additionally, the signals provided by the different sets of infrared sensors may be balanced (e.g., normalized) relative to each other, for example, by providing different physical configurations of various structures in the infrared sensors and/or by performing additional processing on the signals.

In some embodiments, the different sets of infrared sensors may be interleaved with each other and distributed throughout the FPA. As a result, adjacent infrared sensors may capture different images that are spatially-aligned and time-aligned with each other. For example, the infrared sensors may be responsive to different spectral bands to capture different features in the images (e.g., a gas of interest in one image and a background portion of a scene in another image). Such images may be advantageously used to detect the presence of gas with improved accuracy and high confidence.

In one embodiment, a system includes a sensor array configured to receive infrared radiation from a scene comprising a background portion and a gas, the sensor array comprising: a first set of infrared sensors configured with a first spectral response corresponding to a first wavelength range of the infrared radiation associated with the background portion, and a second set of infrared sensors configured with a second spectral response corresponding to a second wavelength range of the infrared radiation associated with the gas; and a read out integrated circuit (ROIC) configured to provide pixel values for first and second images captured by the first and second sets of infrared sensors, respectively, in response to the received infrared radiation.

In another embodiment, a method includes receiving, at a sensor array, infrared radiation from a scene comprising a background portion and a gas; capturing a first image by a first set of infrared sensors of the sensor array configured with a first spectral response corresponding to a first wavelength range of the infrared radiation associated with the background portion; capturing a second image by a second set of infrared sensors of the sensor array configured with a second spectral response corresponding to a second wavelength range of the infrared radiation associated with the gas; and providing, by a read out integrated circuit (ROIC), pixel values for the first and second images.

In another embodiment, a method includes depositing and patterning contacts for first and second sets of infrared sensors of a sensor array; depositing and patterning a primary absorption layer for a bridge of each of the infrared sensors; depositing and patterning an additional absorption layer for the bridges of the second set of infrared sensors; wherein the first set of infrared sensors are configured by the primary absorption layer to exhibit a first spectral response corresponding to a first wavelength range of infrared radiation associated with a background portion of a scene; and wherein the second infrared sensors are configured by the primary absorption layer and the additional absorption layer to exhibit a second spectral response corresponding to a second wavelength range of infrared radiation associated with a gas in the scene.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
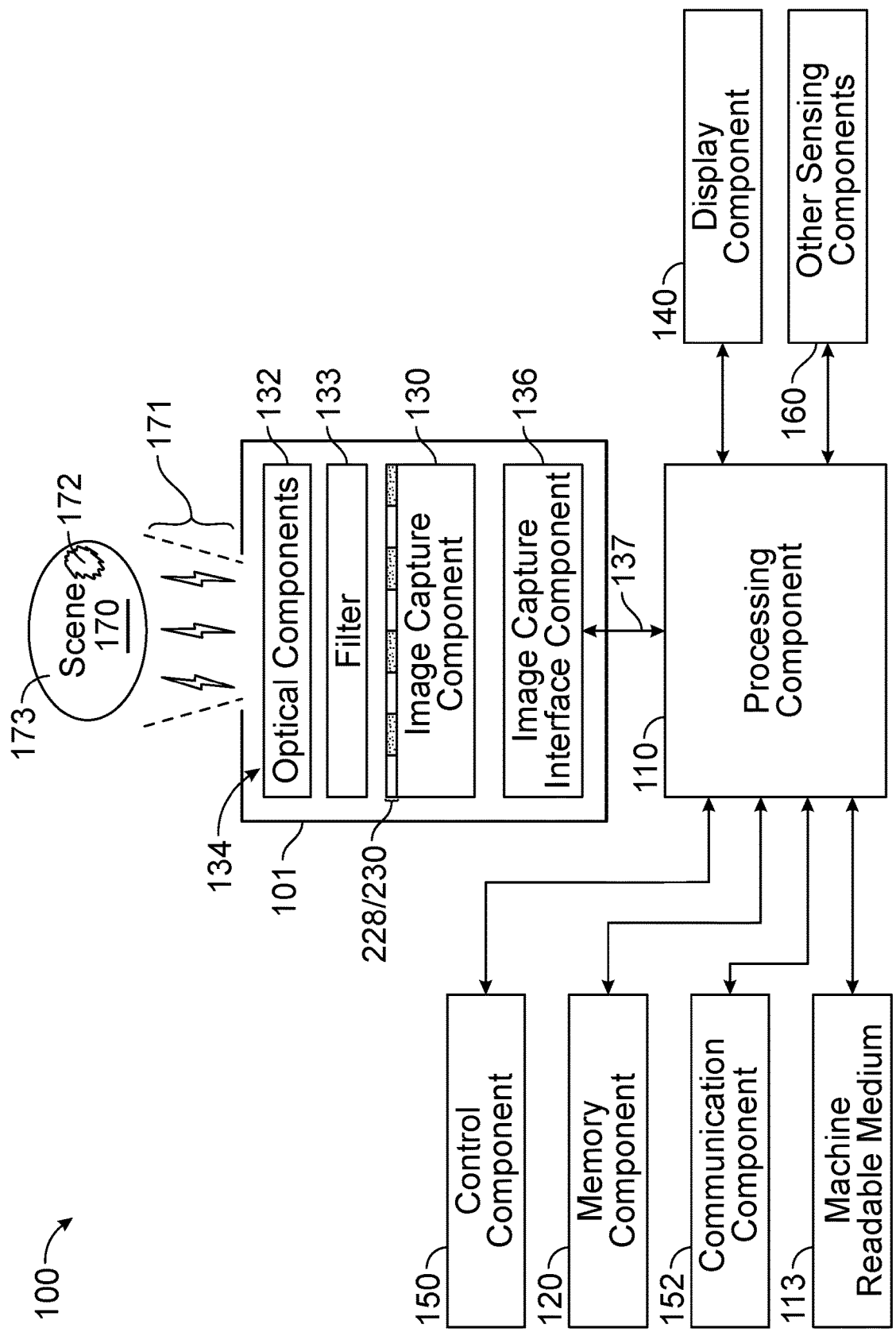
FIG. 1 illustrates a block diagram of an imaging system in accordance with an embodiment of the disclosure.

In accordance with various embodiments discussed herein, gas detection may be performed using a sensor array with infrared sensors (e.g., microbolometers) configured with different spectral response patterns (e.g., spectral absorption patterns) to effectively provide differently filtered images corresponding to different infrared (e.g., thermal) wavelengths. For example, in some embodiments, the differently configured infrared sensors may be distributed in an alternating manner among rows, columns, or both.

As a result, the sensor array may effectively capture at least two different images of a scene simultaneously. For example, a first image may include pixels associated with sensors responsive to a first spectral band of infrared radiation, and a second image may include pixels associated with sensors responsive to a second spectral band of infrared radiation.

By implementing at least two types of infrared sensors corresponding to at least two different spectral bands (e.g., wavelength ranges), the captured images may be used to detect gases of interest. For example, one set of infrared sensors may be responsive to wavelengths associated with a gas to provide one image with pixels corresponding to the sensor array's response at the gas wavelengths (e.g., a "gas image" made up of corresponding "gas pixels"). Another set of infrared sensors may be responsive to wavelengths associated with background radiation of a scene to provide another image with pixels corresponding to the sensor array's response at the background wavelengths (e.g., a "no-gas image" made up of corresponding "no-gas pixels"). In some examples, the wavelengths of the images may overlap (e.g., both images may be responsive to background wavelengths, while only one image is further responsive to gas wavelengths). The different response characteristics of the sets of infrared sensors may be used to provide images that are effectively filtered in accordance with the response characteristics of the infrared sensors.

In addition to the filtering provided by the response characteristics of the infrared sensors themselves, in some embodiments, a filter may be positioned between the imaged scene and the infrared sensor array. This full array filter may be configured to filter (e.g., remove) extraneous out-of-band radiation received from the scene to prevent it from being passed to the infrared sensors. As a result, the pixels provided by the infrared sensors may correspond only to the particular background and/or gas wavelengths of interest and exhibit improved signal-to-noise ratios.

In various embodiments, the particular wavelength ranges (e.g., spectral responses) associated with the infrared sensors and the full array filter may be selected such that all of the sensors (e.g., receiving gas or no-gas filtered infrared radiation) exhibit responses (e.g., provide signals) corresponding to a desired range of pixel values of the captured images. As a result, the captured images may be more effectively processed, calibrated, and compared with each other. In some embodiments, the full array filter may be configured to pass wavelength bands with relatively small variations in reflectance which may further improve the image processing discussed herein.

In some cases, the gas image may exhibit low Noise Equivalent Concentration Length (NECL) and high gas contrast. In addition, the no-gas image may exhibit only minimal contributions from the absorption or emission associated with the gas of interest. Thus, the resulting gas and no-gas images may exhibit high image quality and can be used for accurate quantification and gas visualization. Accordingly, in some embodiments, the various wavelength ranges utilized for the full array filter and different types of infrared sensors may be optimized for low NECL and high gas contrast. Also, in some embodiments, the various wavelength ranges and positioning of filter-related components may be selected to minimize reflectance (e.g., to avoid rapidly changing responses due to reflectance which may cause the infrared sensors to exhibit inconsistent signals that vary over time).

Such arrangements contrast with conventional single-filter approaches in which only a portion of the sensors of an array may be filtered. In such single-filter approaches, only a subset of the sensors are filtered to generate an image used to identify background radiation, while the remaining unfiltered sensors are used to generate an image used to identify a gas of interest. As a result, the unfiltered sensors receive infrared radiation across a wide range of wavelengths, while the filtered sensors receive only a filtered portion of the infrared radiation. This can cause significant disparities in the response of filtered and unfiltered sensors of the array. In such cases, various calibrations must be implemented for the unfiltered and filtered sensors. Thus, images from the filtered and unfiltered images may not be fully captured at the same time.

Moreover, in conventional single-filter approaches, there is typically significant overlap in the wavelengths of infrared radiation received by the filtered and unfiltered sensors. For example, the background radiation filter may still pass at least a subset of the wavelengths associated with the gas of interest. Thus, a gas present in the imaged scene may cause both the filtered and unfiltered sensors to respond. This can significantly complicate and reduce the accuracy of gas visualization and quantification processes using the filtered and unfiltered images. For example, the unfiltered image may correspond to a broad range of wavelengths, resulting in low gas contrast. In addition, the filtered image may exhibit high Noise Equivalent Temperature Difference (NETD) values due to its narrow band, thus making quantification less accurate.

In contrast, the use of at least two sets of infrared sensors responsive to corresponding to different wavelength bands and positioned adjacently as discussed herein permits two differently filtered images to be reliably captured and effectively processed. For example, because the different infrared sensors are distributed throughout the sensor array, different images captured by the different infrared sensors are physically-aligned (e.g., to remove parallax between the images) and are time-aligned (e.g., simultaneously captured).

Also, in cases where all sensors of the array are pre-filtered (e.g., by a full array filter), extraneous out-of-band infrared radiation is removed and the resulting pixels therefore correspond only to the particular wavelengths of interest. As a result, in some embodiments, the sensors may be calibrated with the same integration periods (e.g., integration times) and exhibit acceptably low NETD values. In other embodiments, different integration times may be used for the different types of infrared sensors to further balance the signals provided thereby for the captured images.

Turning now to the drawings, FIG. 1 illustrates a block diagram of an imaging system 100 in accordance with an embodiment of the disclosure. Imaging system 100 may be used to capture and process images in accordance with techniques described herein. In some embodiments, various components of imaging system 100 may be provided in a camera component 101, such as an imaging camera. In other embodiments, one or more components of imaging system 100 may be implemented remotely from each other in a distributed fashion (e.g., networked or otherwise).

In some embodiments, imaging system 100 may be used to detect one or more gases of interest within a scene 170. For example, imaging system 100 may be configured to capture one or more images of scene 170 using camera component 101 (e.g., a thermal imaging camera) in response to infrared radiation 171 received from scene 170. Infrared radiation 171 may correspond to wavelengths that are emitted and/or absorbed by a gas 172 within scene 170, and other wavelengths that are emitted and/or absorbed by a background portion 173 of scene 170.

Captured images may be received by a processing component 110 and stored in a memory component 120. Processing component 110 may be configured to process the captured images in accordance with gas detection techniques discussed herein.

In some embodiments, imaging system 100 includes processing component 110, a machine readable medium 113, a memory component 120, image capture component 130 (e.g., implemented by a sensor array 228 of infrared sensors 230 including at least two sets of alternating sensors as further discussed herein), full array filter 133, optical components 132 (e.g., one or more lenses configured to receive infrared radiation 171 through an aperture 134 in camera component 101), an image capture interface component 136, a display component 140, a control component 150, a communication component 152, and other sensing components 160.

In some embodiments, imaging system 100 may be implemented as an imaging camera, such as camera component 101, to capture images, for example, of scene 170 (e.g., a field of view). In some embodiments, camera component 101 may include image capture component 130, optical components 132, and image capture interface component 136 housed in a protective enclosure. Imaging system 100 may represent any type of camera system which, for example, detects electromagnetic radiation (e.g., infrared radiation 171) and provides representative data (e.g., one or more still images or video images). For example, imaging system 100 may represent a camera component 101 that is directed to detect infrared radiation and/or visible light and provide associated image data.

In some embodiments, imaging system 100 may include a portable device and may be implemented, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive images of scene 170.

In some embodiments, processing component 110 may include any desired type of logic circuit such as, for example, a microprocessor, a single-core processor, a multi-core processor, a microcontroller, a programmable logic device, a digital signal processing (DSP) device, one or more memories for storing executable instructions (e.g., software, firmware, or other instructions), and/or any other appropriate combinations of processing device and/or memory to execute instructions to perform any of the various operations described herein. Processing component 110 is configured to interface and communicate with the various components illustrated in FIG. 1 to perform method and processing steps as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is configured to execute software stored in memory component 120 and/or machine readable medium 113 to perform various methods, processes, and operations in a manner as described herein.

In some embodiments, image capture component 130 may include an array of sensors (e.g., any type visible light, infrared, or other type of detector) for capturing images of scene 170. In one embodiment, the sensors of image capture component 130 provide for representing (e.g., converting) a captured images of scene 170 as digital data (e.g., via an analog-to-digital converter included as part of the sensor or separate from the sensor as part of imaging system 100). As further discussed herein, image capture component 130 may be implemented as an array of infrared sensors having at least two different types of sensors implemented with different spectral response patterns distributed among the various sensors of the array.

In some embodiments, processing component 110 may be configured to receive images from image capture component 130 over a connection 137, process the images, store the original and/or processed images in memory component 120, and/or retrieve stored images from memory component 120. In various aspects, processing component 110 may be remotely positioned, and processing component 110 may be configured to remotely receive images from image capture component 130 via wired or wireless communication with image capture interface component 136, as described herein. Processing component 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Processing component 110 may be configured to display image data and information on display component 140. Processing component 110 may be configured to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In some embodiments, control component 150 may include a user input and/or interface device having one or more user actuated components, such as one or more push buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Processing component 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, processing component 110 may be configured to communicate with image capture interface component 136 (e.g., by receiving data and information from image capture component 130). Image capture interface component 136 may be configured to receive images from image capture component 130 and communicate the images to processing component 110 directly or through one or more wired or wireless communication components (e.g., represented by connection 137) in the manner of communication component 152 further described herein. Camera component 101 and processing component 110 may be positioned proximate to or remote from each other in various embodiments.

In some embodiments, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a network interface component (NIC) configured for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
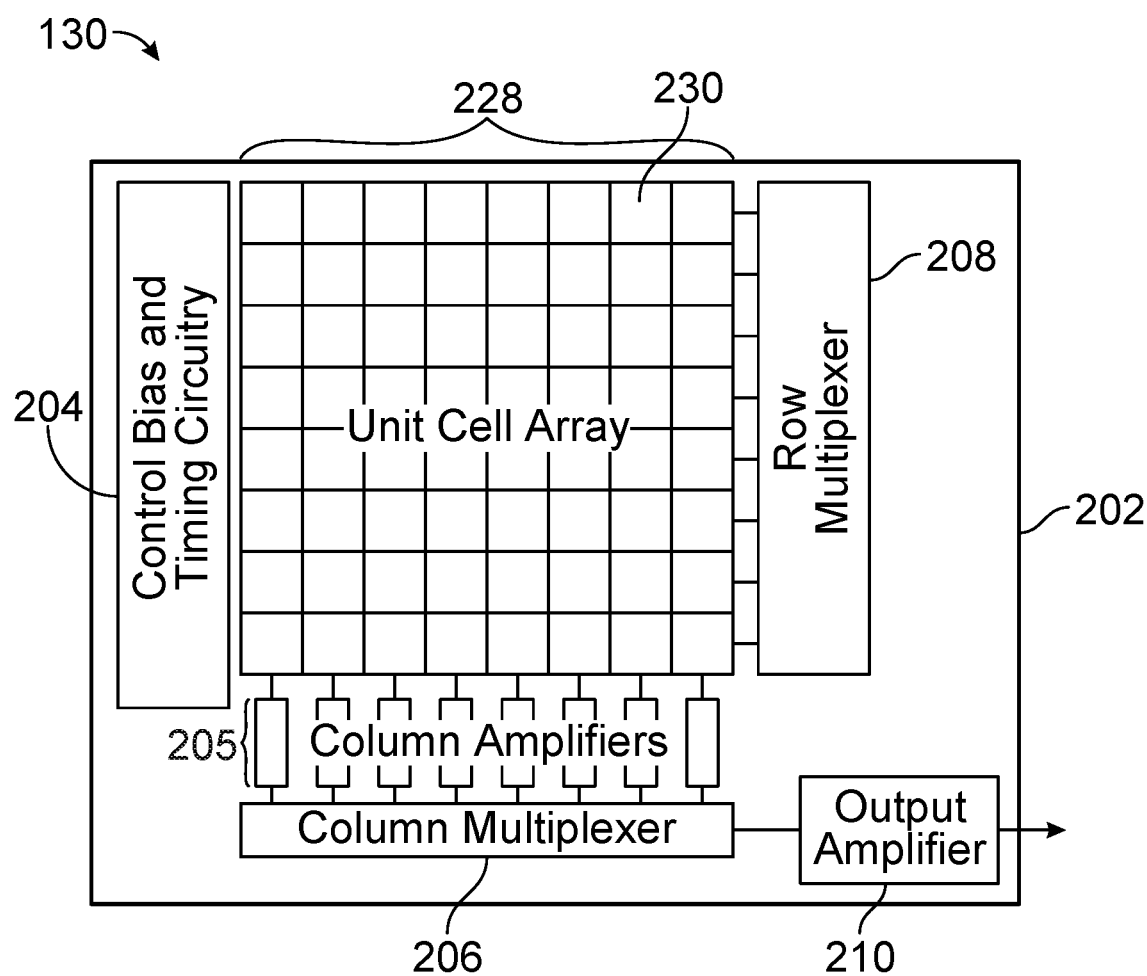
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including a sensor array 228 of infrared sensors 230 (e.g., implemented as unit cells) and a read out integrated circuit (ROIC) 202. Although an 8 by 8 array of infrared sensors 230 is shown, this is merely for purposes of example and ease of illustration. Any desired sensor array size may be used as desired.

ROIC 202 includes bias generation and timing control circuitry 204, column amplifiers 205, a column multiplexer 206, a row multiplexer 208, and an output amplifier 210. Images captured by infrared sensors 230 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Each infrared sensor 230 may be implemented, for example, by an infrared detector such as a microbolometer and associated circuitry to provide image data (e.g., a data value associated with a captured voltage) for a pixel of a captured image. In this regard, time-multiplexed electrical signals may be provided by the infrared sensors 230 to ROIC 202. As further discussed herein, at least two different types of infrared sensors 230 may be provided (e.g., identified separately as infrared sensors 230A and 230B), each of which exhibits a different spectral response pattern to permit the FPA to capture at least two differently filtered images.

Figure 4:
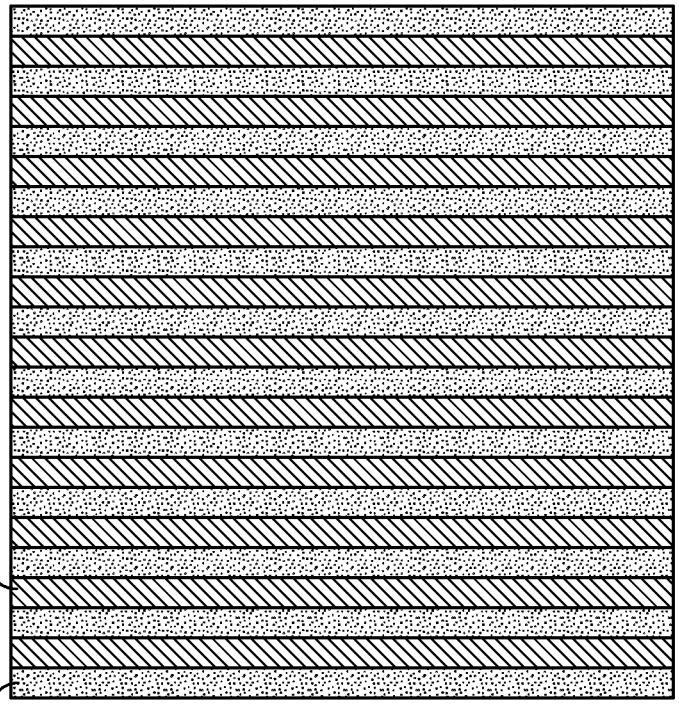
FIG. 4 illustrates a front view of a sensor array with infrared sensors arranged in an alternating column pattern in accordance with an embodiment of the disclosure.
Figure 3:
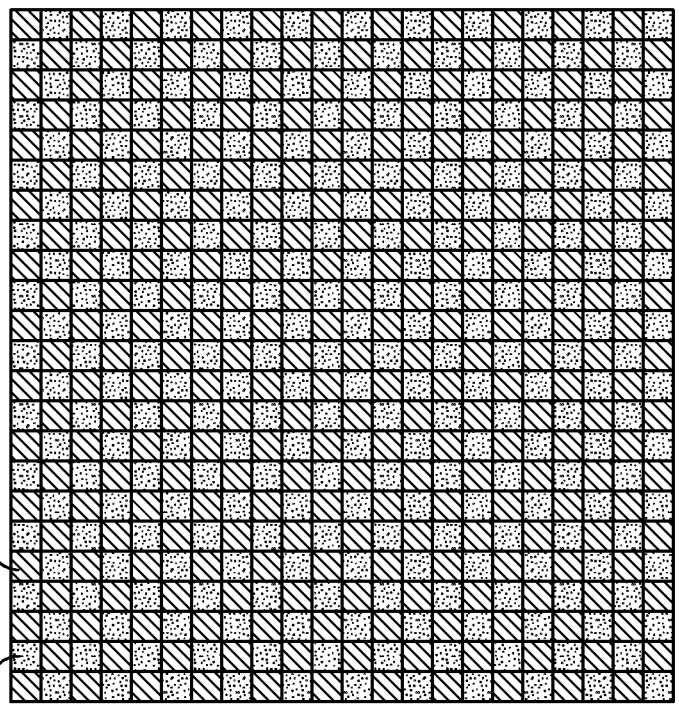
FIG. 3 illustrates a front view of a sensor array with infrared sensors arranged in an alternating checkerboard pattern in accordance with an embodiment of the disclosure.

In various embodiments, sensor array 228 may include different types of infrared sensors 230A and 230B arranged in a variety of patterns to permit two images corresponding to different spectral response patterns to be captured by the same FPA. For example, FIG. 3 illustrates a front view of sensor array 228 with infrared sensors 230A and 230B arranged in an alternating checkerboard pattern, while FIG. 4 illustrates a front view of sensor array 228 infrared sensors 230A and 230B arranged in an alternating column pattern (e.g., rows and columns may be used interchangeably).

In some embodiments, infrared sensors 230A may be implemented as gas sensors configured with a spectral response pattern including wavelengths associated with one or more gases to be detected. As a result, infrared sensors 230A may be used to provide gas pixels of gas images. Infrared sensors 230B may be implemented as no-gas sensors configured with a spectral response pattern omitting wavelengths associated with one or more gases to be detected. As a result, infrared sensors 230B may be used to provide no-gas pixels of no-gas images.

Because infrared sensors 230A and 230B are distributed throughout the sensor array (e.g., in various patterns such as those shown in FIGS. 3 and 4 or other patterns), the resulting gas images and no-gas images are effectively aligned with each other with no parallax. In addition, because infrared sensors 230A and 230B (and also full array filter 133) may be configured to restrict the wavelengths used to provide such images, infrared sensors 230A and 230B may be operated with the same (e.g., identical) integration periods, gain settings, and readout frame rates in some embodiments. In other embodiments, these may be different for infrared sensors 230A and 230B.

In some embodiments, ROIC 202 may be configured to compensate for different signals received from infrared sensors 230A and 230B. For example, because infrared sensors 230A and 230B may be responsive to different wavelengths (e.g., which may or may not partially overlap with each other), the resulting current signals received by ROIC from infrared sensors 230A and 230B may vary in amplitude relative to each other or be otherwise disproportionate. Accordingly, in some embodiments, ROIC 202 may be configured to adjust the integration times, increase or decrease the resulting captured voltages (or other analog signal or digital value), and/or other features associated with infrared sensors 230A and/or 230B so that they may be effectively compared with each other. In some embodiments, the ROIC 202 may be implemented in accordance with any of the various configurations identified in: U.S. Patent Application No. 62/446,287 filed Jan. 13, 2017, U.S. Patent Application No. 62/450,967 filed Jan. 26, 2017, U.S. Patent Application No. 62/588,878 filed Nov. 20, 2017, U.S. Patent Application No. 62/599,574 filed Dec. 15, 2017, and/or U.S. Patent Application No. 62/611,711 filed Dec. 29, 2017, all of which are incorporated herein by reference in their entirety.

Figure 5:
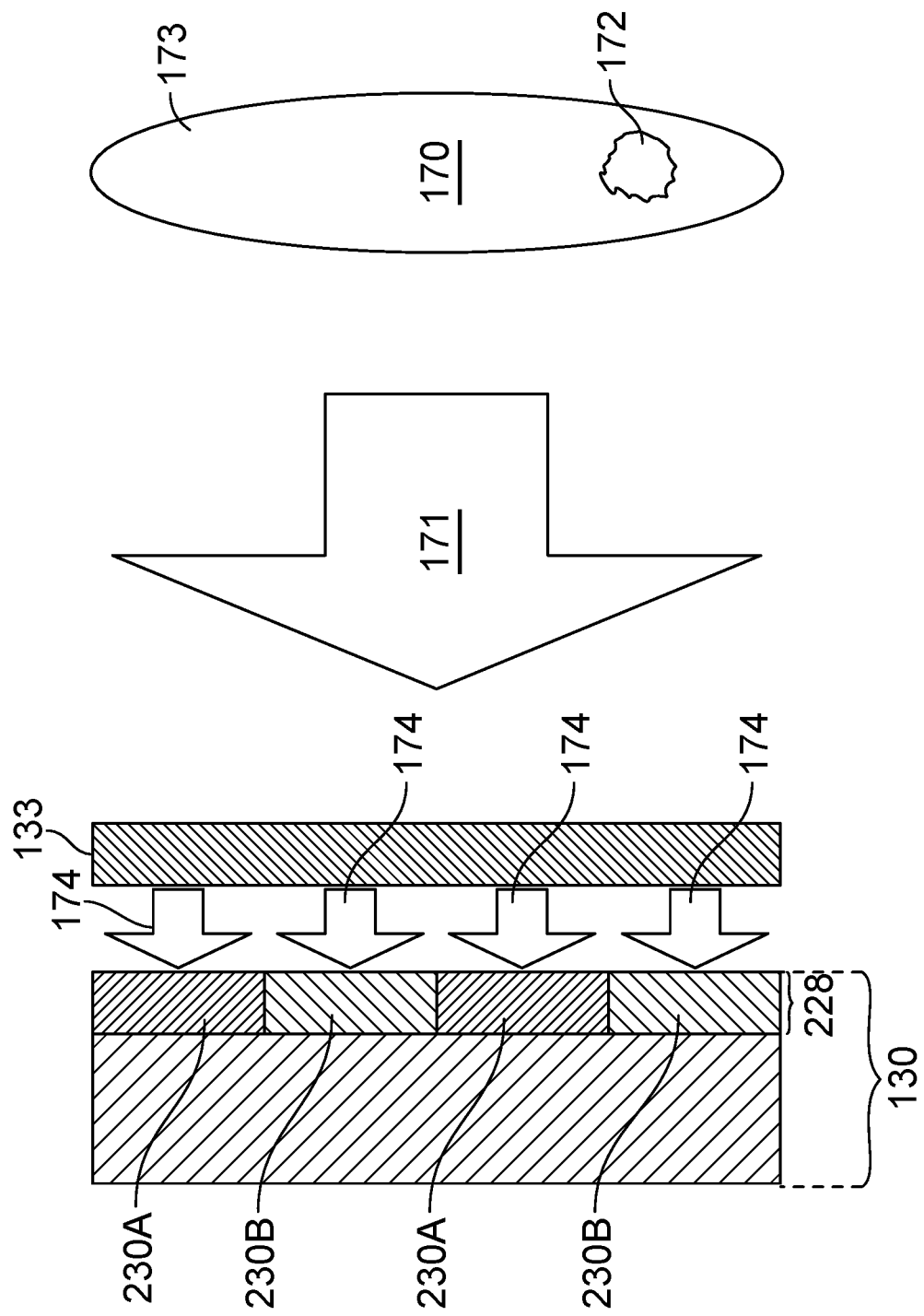
FIG. 5 illustrates a side view of infrared sensors and a full array filter in accordance with an embodiment of the disclosure.

FIG. 5 illustrates a side view of infrared sensors 230A and 230B and full array filter 133 in accordance with an embodiment of the disclosure. As shown, full array filter 133 receives infrared radiation 171 from scene 170 (e.g., corresponding to wavelengths that are emitted and/or absorbed by gas 172 and/or background portion 173) and provides filtered infrared radiation 174 to infrared sensors 230A and 230B of sensor array 228 of image capture component 130.

As discussed, full array filter 133 may be configured to remove extraneous out-of-band radiation received from scene 170 such that filtered infrared radiation 174 provided to infrared sensors 230A and 230B is limited to particular filtered wavelengths of interest. As a result, the signals provided by infrared sensors 230A and 230B for their associated pixels may exhibit improved signal-to-noise ratios.

Figure 6:
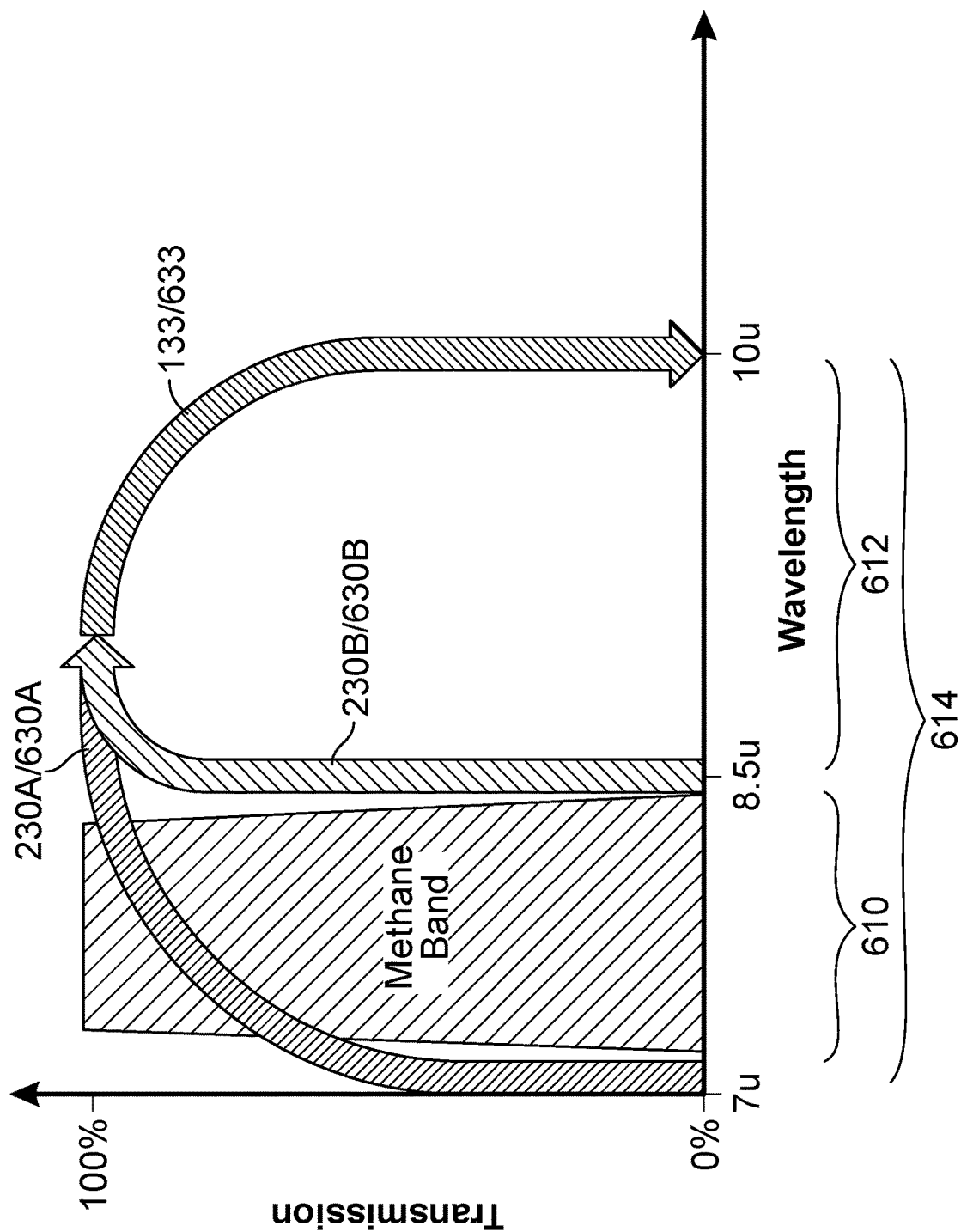
FIGS. 6 and 7 illustrate various wavelengths associated with infrared sensors and a filter in accordance with embodiments of the disclosure.
Figure 7:
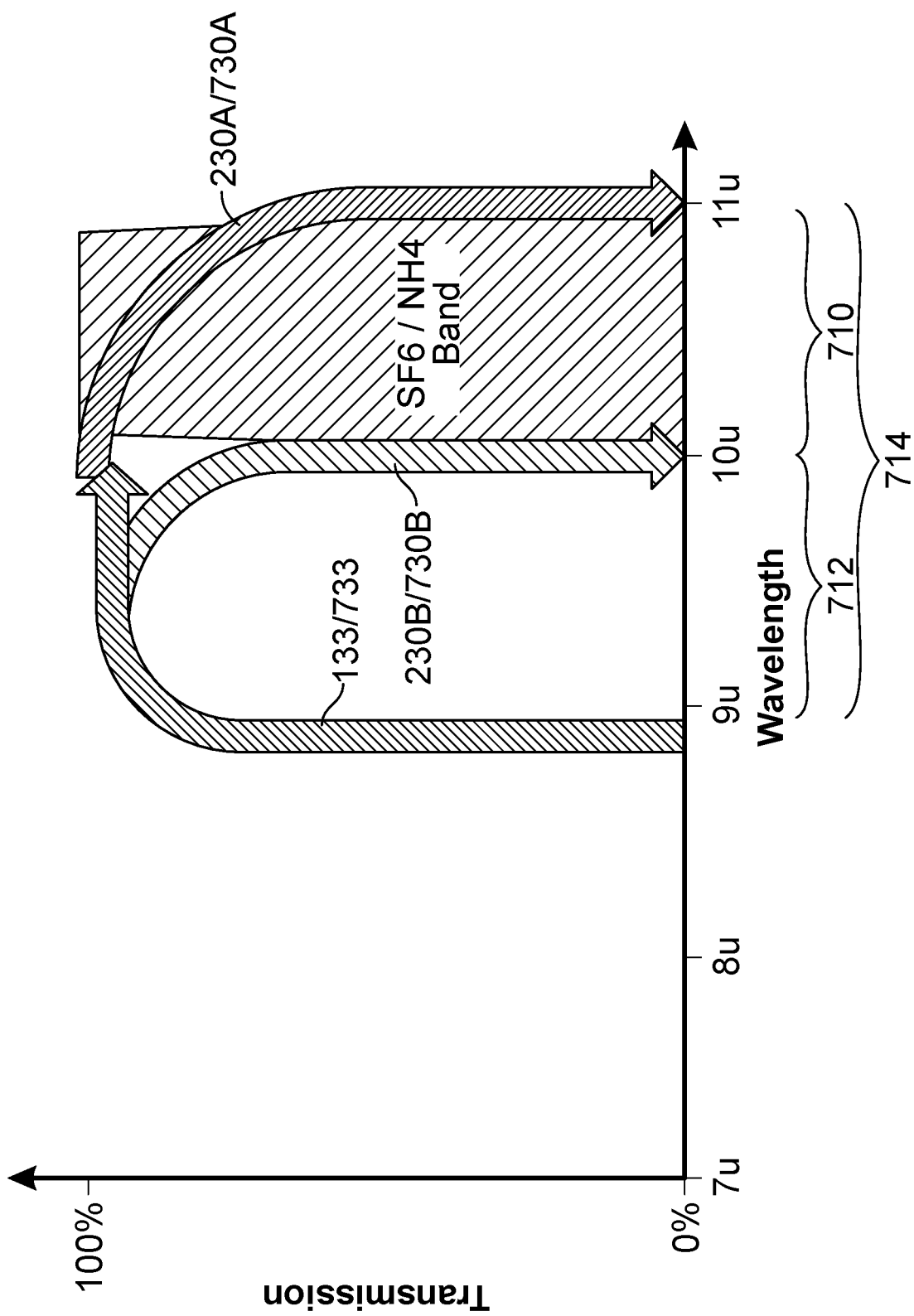

In various embodiments, the particular wavelengths filtered by infrared sensors 230A and 230B and full array filter 133 may be selected (e.g., tuned or optimized) to detect various gases of interest. Although various wavelength ranges are represented in FIGS. 6 and 7 and discussed herein are provided merely for purposes of example. As such, any desired wavelength ranges may be used as appropriate.

FIG. 6 illustrates an embodiment in which the wavelengths associated with infrared sensors 230A and 230B and full array filter 133 are configured for the detection of methane (CH4). As shown, methane generally absorbs radiation in a wavelength range 610 of approximately 7 microns to approximately 8.5 microns.

In this embodiment, the spectral response pattern of infrared sensors 230A effectively provides a high pass filter having a response curve 630A with a cut-on wavelength in a range from approximately 7 microns to approximately 8.5 microns (e.g., approximately 7 microns is shown in FIG. 6). The spectral response pattern of infrared sensors 230B effectively provide a high pass filter having a response curve 630B with a cut-on wavelength in a range from approximately 7 microns to approximately 8.5 microns (e.g., approximately 8.5 microns is shown in FIG. 6), which in some embodiments may be NECL optimized. Filter 133 provides a low pass filter having a response curve 633 with a cut-off wavelength in a range from approximately 7 microns to approximately 10 microns (e.g., approximately 10 microns is shown in FIG. 6).

By configuring infrared sensors 230B with a higher cut-on wavelength than infrared sensors 230A, there will be at least some portion of the methane wavelength range 610 that does not overlap between infrared sensors 230A and 230B. For example, by configuring infrared sensors 230A and 230B with cut-on wavelengths of approximately 7 microns and 8.5 microns, respectively, infrared sensors 230A will be responsive in the methane wavelength range 610, while infrared sensors 230B will not. As a result, images provided by infrared sensors 230A may be gas images that represent the presence or absence of methane in gas 172 within scene 170, while images provided by infrared sensors 230B may be no-gas images that represent background portion 173 of scene 170.

In addition, by configuring filter 133 with a cut-off wavelength higher than the cut-on wavelengths of infrared sensors 230A and 230B, filter 133 will remove out-of-band wavelengths of infrared radiation 171 such that filtered infrared radiation 174 may include wavelength range 614 that may be imaged by infrared sensors 230A and 230B with improved signal-to-noise ratios and higher sensitivity. For example, in the embodiment illustrated in FIG. 6, infrared sensors 230A will have a spectral response pattern corresponding to wavelength range 614 from approximately 7 microns to approximately 10 microns, and infrared sensors 230B will have a spectral response pattern corresponding to wavelength range 612 from approximately 8.5 microns to approximately 10 microns (e.g., the upper end of each range being limited by filter 133).

In various embodiments, the wavelength ranges associated with filter 133 and infrared sensors 230A/230B may be adjusted, for example, depending on the particular gas to be imaged, expected gas volumes, and the signal levels desired to be provided for each pixel of the captured images.

For example, in another embodiment, one or more refrigerant gases may be detected by configuring infrared sensors 230A with a spectral response pattern to effectively provide a high pass filter having a response curve 630A with a cut-on wavelength in a range from approximately 8 microns to approximately 8.6 microns, configuring infrared sensors 230B with a spectral response pattern to effectively provide a high pass filter having a response curve 630B with a cut-on wavelength in a range from approximately 8 microns to approximately 8.6 microns, and configuring filter 133 as a low pass filter having a response curve 633 with a cut-off wavelength in a range from approximately 8 microns to approximately 11 microns.

Again, by configuring infrared sensors 230B with a higher cut-on wavelength than infrared sensors 230A, there will be at least some portion of the refrigerant gas wavelength range that does not overlap between infrared sensors 230A and 230B. In addition, by configuring filter 133 with a cut-off wavelength higher than the cut-on wavelengths of infrared sensors 230A and 230B, filter 133 will remove out-of-band wavelengths of infrared radiation 171 such that filtered infrared radiation 174 may be imaged by infrared sensors 230A and 230B with improved signal-to-noise ratios and higher sensitivity.

In another embodiment, FIG. 7 illustrates the wavelengths associated with infrared sensors 230A and 230B and full array filter 133 configured for the detection of sulfur hexafluoride (SF6) and ammonium (NH4). As shown, sulfur hexafluoride and ammonium generally absorbs radiation in a wavelength range 710 of approximately 10 microns to approximately 11 microns.

In this embodiment, infrared sensors 230A are configured with a spectral response pattern to effectively provide a low pass filter having a response curve 730A with a cut-off wavelength in a range from approximately 10 microns to approximately 11 microns (e.g., approximately 11 microns is shown in FIG. 7). Infrared sensors 230B are configured with a spectral response pattern to effectively provide a low pass filter having a response curve 730B with a cut-off wavelength in a range from approximately 10 microns to approximately 11 microns (e.g., approximately 10 microns is shown in FIG. 7). Filter 133 provides a high pass filter having a response curve 733 with a cut-on wavelength in a range from approximately 8 microns to approximately 10 microns (e.g., approximately 8.8 microns is shown in FIG. 7).

By configuring infrared sensors 230B with a lower cut-off wavelength than infrared sensors 230A, there will be at least some portion of the sulfur hexafluoride and ammonium wavelength range 710 that does not overlap between infrared sensors 230A and 230B. For example, by configuring infrared sensors 230A and 230B with cut-off wavelengths of approximately 11 microns and 10 microns, respectively, infrared sensors 230A will be responsive in the hexafluoride and ammonium wavelength range 710, while infrared sensors 230B will not. As a result, images provided by infrared sensors 230A may be gas images that represent the presence or absence of hexafluoride or ammonium in gas 172 within scene 170, while images provided by infrared sensors 230B may be no-gas images that represent background portion 173 of scene 170.

In addition, by configuring filter 133 with a cut-on wavelength lower than the cut-off wavelengths of infrared sensors 230A and 230B, filter 133 will remove out-of-band wavelengths of infrared radiation 171 such that filtered infrared radiation 174 may include wavelength range 714 that may be imaged by infrared sensors 230A and 230B with improved signal-to-noise ratios and higher sensitivity. For example, in the embodiment illustrated in FIG. 7, infrared sensors 230A will have a spectral response pattern corresponding to wavelength range 714 from approximately 8.8 microns to approximately 11 microns, and infrared sensors 230B will have a spectral response pattern corresponding to wavelength range 712 from approximately 8.8 microns to approximately 10 microns (e.g., the lower end of each range being limited by filter 133).

Figure 8:
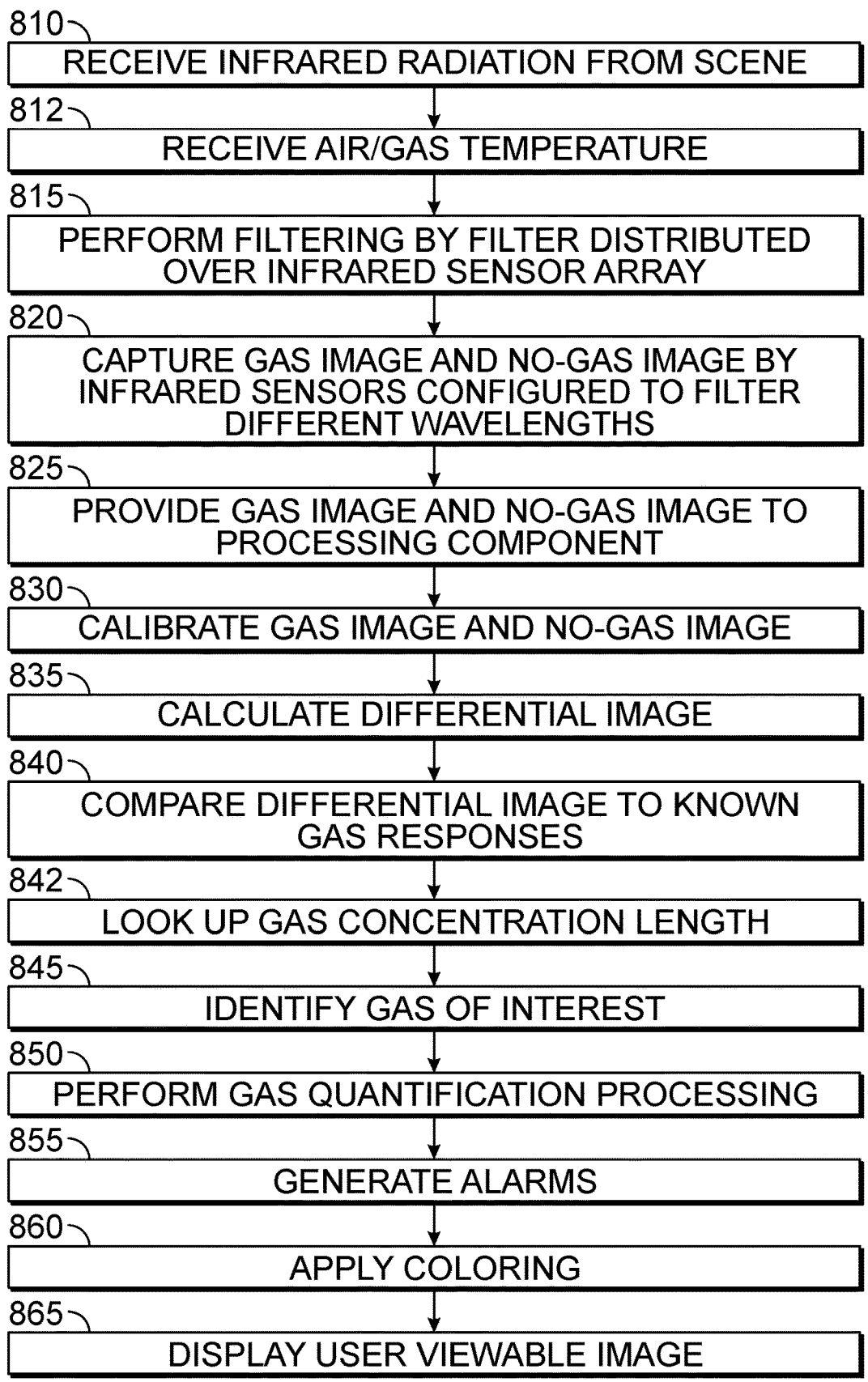
FIG. 8 illustrates a process of performing imaging in accordance with an embodiment of the disclosure.

FIG. 8 illustrates a process of performing thermal imaging using different sets of infrared sensors 230A and 230B in accordance with an embodiment of the disclosure. In block 810, system 100 receives infrared radiation 171 from scene 170. As discussed, infrared radiation 171 may include wavelengths that are emitted and/or absorbed by gas 172 within scene 170, and other wavelengths that are emitted and/or absorbed by background portion 173 of scene 170. Infrared radiation 171 passes through aperture 134 and optical components 132 which cause infrared radiation 171 to be directed and focused toward sensor array 228 of image capture component 130.

In block 812, the temperature Tgas (e.g., air temperature) of gas 172 (e.g., the gas temperature is assumed to quickly reach thermal equilibrium with the air) and the temperature Tb of background portion 173 of scene 170 are received, for example, by measurements of one or more temperature sensors provided by sensing components 160 and/or by processing one or more captured images.

In block 815, infrared radiation 171 passes through filter 133 to provide filtered radiation 174 which is received by infrared sensors 230A and 230B as shown in FIG. 5.

In block 820, infrared sensors 230A and 230B capture gas and no-gas images, respectively, in response to filtered radiation 174. As discussed, the use of at least two differently configured sets of infrared sensors 230A and 230B in an alternating manner permits, in some embodiments, the gas and no-gas images to be physically-aligned with each other with no parallax, and also time-aligned through simultaneous capture. In some embodiments, the signals associated with the captured images may be passed from infrared sensors 230A and 230B to ROIC 202 as current signals which are stored as voltages by capacitors of ROIC 202.

In block 825, ROIC 202 provides the gas and no-gas images (e.g., converted from stored voltages to digital counts) to image capture interface component 136, which provides them to processing component 110 over connection 137.

In block 830, processing component 110 calibrates the gas and no-gas images. In some embodiments, this may include calibrating the images against each other, performing radiometric calibrations on the images, and/or other processing. In some embodiments, this may include adjusting the gains of gas pixels and/or no-gas pixels of the images such that the overall pixel values (e.g., digital counts) are comparable to each other.

As discussed, because all infrared sensors 230 are filtered by full array filter 133, extraneous out-of-band infrared radiation is removed and the resulting gas pixels and no-gas pixels of the gas image and no-gas image therefore correspond only to the particular filtered wavelengths of interest captured by infrared sensors 230A and 230B. In various embodiments, the spectral response of infrared sensors 230A and 230B may be selected such that all of infrared sensors 230A and 230B exhibit responses corresponding to a desired range of pixel values for gas and no-gas images. As a result, the gas and no-gas images can be more effectively calibrated in block 830. This calibration can significantly improve the quality of a differential image generated from the gas and no-gas images (e.g., providing greater contrast between gas 172 and background portion 173 to better distinguish between them in the differential image), which consequently provides more reliable quantification and more accurate alarms.

In block 835, processing component 110 generates a differential image based on the calibrated gas and no-gas images. For example, processing component 110 may subtract either of the captured images from the other. It will be understood that such subtraction may be performed accurately and with high confidence because the original gas and no-gas images may be captured in a spatially-aligned and time-aligned manner in accordance with the techniques discussed herein. The resulting differential image will therefore exhibit high contrast between its no-gas and gas portions for use in further processing as discussed herein.

In block 840, processing component 110 compares the gas band response evident in the differential image to one or more known gas band responses (e.g., stored in a database or other data structure maintained in machine readable medium 113 and/or memory component 120). In this regard, processing component 110 may determine whether the differential image exhibits significant absorption and/or emission patterns associated with one or more known gases in the database.

In block 842, the absolute temperature difference DT of the gas temperature Tgas and background temperature Tb is determined (e.g., DT=Tb−Tgas). Also in block 842, this difference DT is used to determine a gas concentration length, for example, from a predetermined table (e.g., stored in a database or other data structure maintained in machine readable medium 113 and/or memory component 120).

In block 845, processing component 110 identifies the particular gas 172 in scene 170 based on the comparison of block 840.

In block 850, processing component 110 performs gas quantification processing based on the concentration length determined in block 842, the differential image, and/or one or more of the captured gas and no-gas images. In various embodiments, such processing may include, for example, generation and analysis of one or more concentration length (CL) images, gas flow calculations, and/or other operations.

In block 855, processing component 100 generates one or more alarms in response to the identification and/or quantification of blocks 845 and/or 850. For example, in various embodiments, such alarms may be communicated to a user through display component 140, communication component 152, and/or other components using various media such as text, graphics, audio signals, and/or other ways as appropriate.

As discussed, the use of infrared sensors 230A and 230B with different response characteristics permit the differential image to exhibit increased contrast between gas 172 and background portion 173. Such increased contrast (e.g., through further separation of gas 172 from background portion 173 in the differential image) can permit processing component 110 to better distinguish between gas 172 and background portion 173 in the differential image, thus improving the accuracy of the gas identification of block 845, the gas quantification of block 850, and/or the alarm generation of block 855 (e.g., reduced false alarm rates).

In block 860, processing component 110 applies coloring to the differential image to provide a user viewable image. In block 865, processing component 110 provides the user viewable image to display component 140 for display and/or further manipulation by a user of system 100.

Various implementations may be used to configure infrared sensors 230A and 230B with different spectral responses. In some embodiments, infrared sensors 230A and 230B may be implemented with different physical configurations that result in the different spectral responses.

Figure 9:
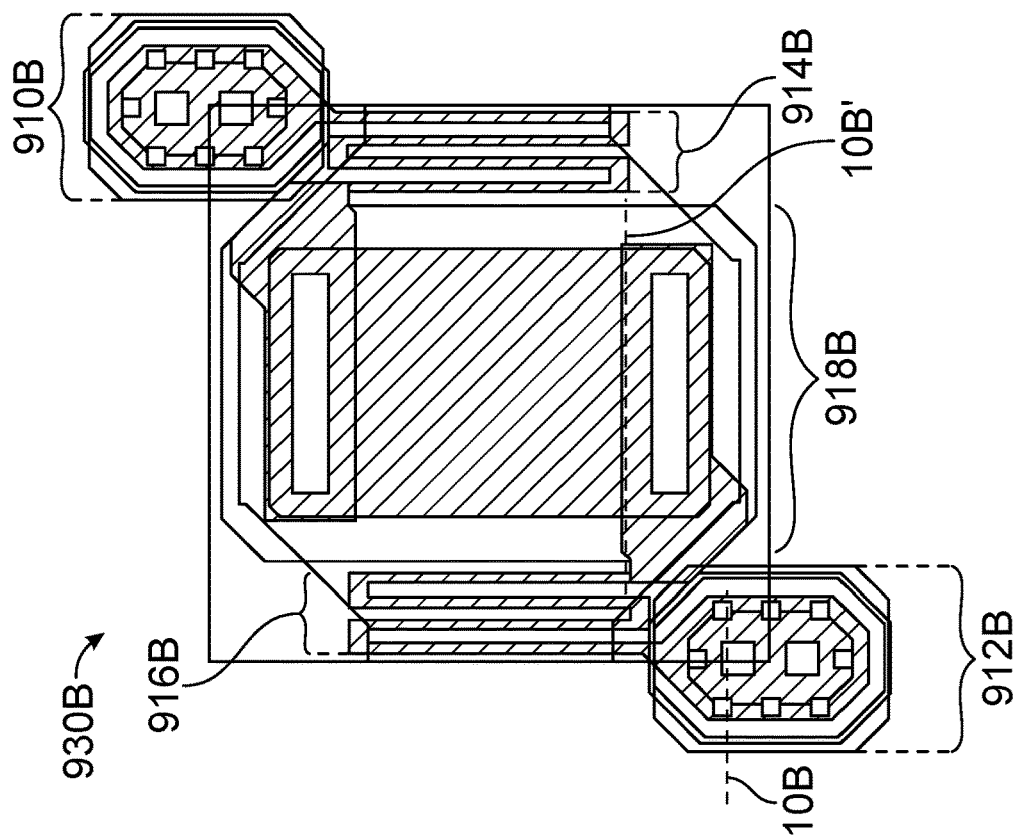
FIG. 9 illustrates a top view of infrared sensors with one having an upper absorption layer in a material-on-pixel (MOP) arrangement in accordance with an embodiment of the disclosure.
Figure 9:
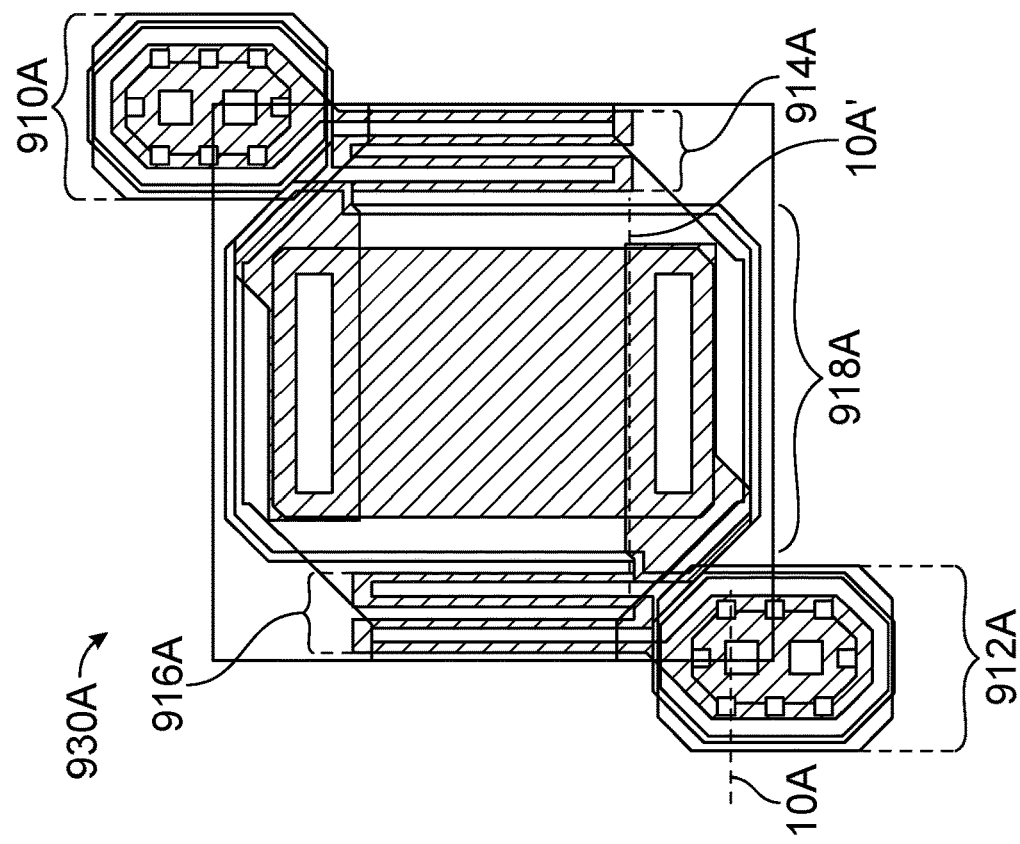
Figure 10:
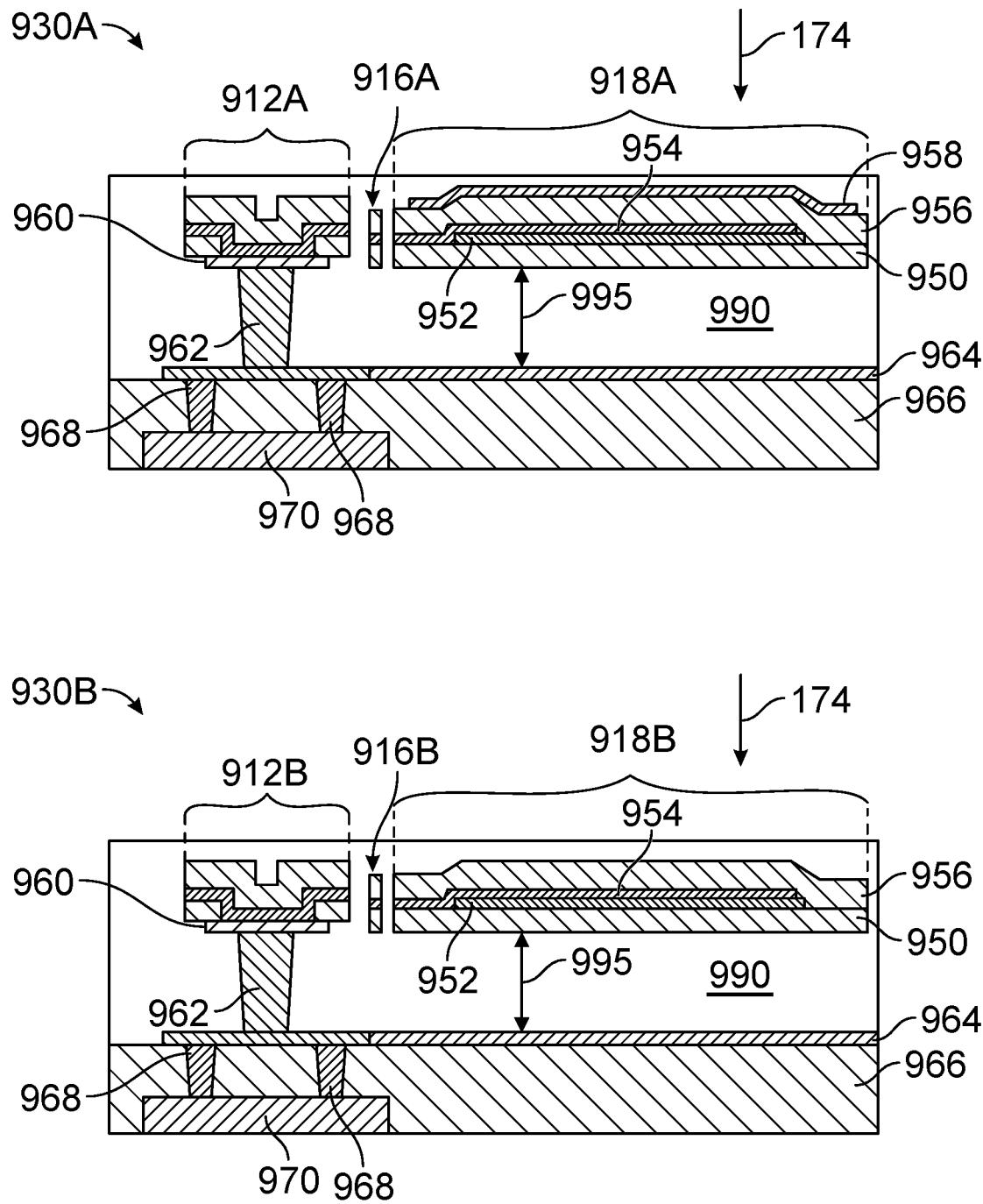
FIG. 10 illustrates a cross-sectional view of infrared sensors taken at lines 10A/10A' and 10B/10B' of FIG. 9 in accordance with an embodiment of the disclosure.

For example, FIG. 9 illustrates a top view of infrared sensors 930A and 930B with infrared sensor 930A having an upper absorption layer in a material-on-pixel (MOP) arrangement in accordance with an embodiment of the disclosure. In this case, infrared sensors 930A and 930B are positioned adjacent to each other and used to implement individual ones of infrared sensors 230A and 230B, respectively, as part of sensor array 228. FIG. 10 illustrates cross-sectional views of infrared sensors 930A and 930B taken at lines 10A/10A' and 10B/10B' of FIG. 9 in accordance with an embodiment of the disclosure. As shown, infrared sensors 930A and 930B may be microbolometers implemented with substantially similar structures, but with infrared sensor 930A including an additional absorption layer 958 in a MOP arrangement.

Infrared sensor 930A includes contacts 910A and 912A connected to corresponding legs 914A and 916A which are connected to a bridge 918A. As shown in FIG. 10, various portions of contact 912A, leg 916A, and bridge 916A may be implemented by an insulating layer 950 (e.g., a dielectric in some embodiments), a conductive layer 954 (e.g., a metal layer), and an additional insulating layer 956. Contact 912A further includes a metal stud 962 and a metal cap 960. Bridge 918A further includes a primary absorption layer 952 (e.g., vanadium oxide in some embodiments) and an additional absorption layer 958. Contact 910A and leg 914A may be implemented in a similar manner as discussed for contact 912A and leg 916A.

As further shown in FIG. 10, bridge 918A is suspended above a reflective layer 964 (e.g., a reflective metal layer) with an optical cavity 995 disposed therebetween with a height 995. Reflective layer 964 is disposed on a substrate 966. Metal stud 962 connects to various circuitry 970 (e.g., portions of ROIC 202) through metal vias 968. Contacts 910A and 912A are electrically connected to primary absorption layer 952 through conductive layer 954 which is included in contacts 910A/912A, legs 914A/916A, and bridge 918A.

In operation, a bias voltage is applied across contacts 910A and 912A (e.g., by control bias and timing circuitry 204), thus providing the bias voltage across primary absorption layer 952. As filtered radiation 174 is received by infrared sensor 930A, it passes downward through the various illustrated layers. Primary absorption layer 952 is configured to exhibit a change in resistance in response to the incident filtered radiation 174. A resulting current provided in response to the applied bias voltage and the changing resistance passes through conductive layer 954, metal cap 960, metal stud 962, and metal vias 968 to circuitry 970 (e.g., ROIC 202) where it is captured, for example, as a voltage stored by a capacitor that may be read out and converted to a digital value.

Insulating layers 950 and 956 operate to contain (e.g., trap) the received filtered radiation 174 to further increase the change in resistance exhibited by primary absorption layer 952. Reflective layer 964 reflects unabsorbed portions of the filtered infrared radiation 174 back up toward primary absorption layer 952 for further absorption and associated change in resistance. In this regard, the height 995 and/or other dimensions of the optical cavity 990 between bridge 918A and reflective layer 964 may be configured as desired to shift and/or extend the spectral response of infrared sensor 930A, for example, to a gas band as may be desired for particular implementations. In some embodiments, the use of the additional absorption layer 958 in a MOP implementation in FIGS. 9 and 10 may be implemented with less of a change in the dimensions of the optical cavity 990 than the use of an additional absorption layer 959 in a MUP implementation in FIGS. 11 and 12.

In some embodiments, the resistance exhibited by primary absorption layer 952 may be further affected by the presence of the additional absorption layer 958 which is provided above primary absorption layer 952 (e.g., in a MOP arrangement). In this regard, the thermal properties of additional absorption layer 958 may cause primary absorption layer 952 in infrared sensor 930A to exhibit a greater change in resistance in response to wavelengths than it would otherwise exhibit if additional absorption layer 958 were not present. For example, in some embodiments, this may cause primary absorption layer 952 in infrared sensor 930A to exhibit a change in resistance in the methane wavelength range, refrigerant gas wavelength range, sulfur hexafluoride wavelength range, and/or ammonium wavelength range as discussed with regard to FIGS. 6 and 7. As a result, infrared sensor 930A may be responsive to particular gas wavelengths and may be used to provide a gas pixel of an image.

Various materials may be used for additional absorption layer 958. For example, in some embodiments, additional absorption layer 958 may be implemented as a metal layer. In some embodiments, additional absorption layer 958 may be implemented as an insulating material such as silicon nitride (Si3N4), silicon dioxide (SiO2), and/or others. Any appropriate material may be selected, for example, to exhibit different absorption properties than other layers. For example, if additional absorption layer 958 is implemented using metal or silicon nitride in some embodiments, then it may exhibit different absorption properties than primary absorption layer 952 (e.g., implemented using vanadium oxide in some embodiments) and insulating layers 950 and 956 (e.g., implemented using silicon dioxide in some embodiments). As a result, the spectral response of infrared sensor 930A may be adjusted based on the materials used to implement the various layers.

Infrared sensor 930B may be implemented and operated in a substantially similar manner as infrared sensor 930A. For example, in some embodiments, infrared sensors 930A and 930B may be provided on a common substrate 966 and manufactured during the same manufacturing process. As shown, infrared sensor 930B includes contacts 910B/912B, legs 914B/916B, and a bridge 918B that are implemented using most of the same layers and components as infrared sensor 930A including insulating layer 950, conductive layer 954, additional insulating layer 956, metal stud 962, metal cap 960, primary absorption layer 952, and metal vias 968.

Significantly, infrared sensor 930B does not include the additional absorption layer 958 of infrared sensor 930A. As such, the resistance exhibited by primary absorption layer 952 in infrared sensor 930B will not be affected by the presence of the additional absorption layer 958 in the same manner as that of infrared sensor 930A. In particular, the primary absorption layer 952 in infrared sensor 930B will exhibit a different change in resistance in response to wavelengths in comparison with that of infrared sensor 930A. For example, in some embodiments, this may cause primary absorption layer 952 in infrared sensor 930B to not exhibit a significant change in resistance in the additional wavelength ranges for various gases as discussed with regard to FIGS. 6 and 7. As a result, infrared sensor 930B may not be responsive to particular gas wavelengths and thus may be used to provide a no-gas pixel of an image.

Accordingly, by implementing infrared sensor 930A with additional absorption layer 958, and omitting that layer from infrared sensor 930B, infrared sensors 930A and 930B may be used to provide gas and no-gas pixels for images captured by sensor array 228. Moreover, the spectral response of infrared sensor 930A may be determined by the position, thickness, and/or material of additional absorption layer 958 in relation to the other various layers and components of infrared sensor 930A. By adjusting one or more of these factors, the additional absorption layer 958 may be used to select a desired spectral response for infrared sensor 930A that corresponds to a gas band of interest.

Figure 11:
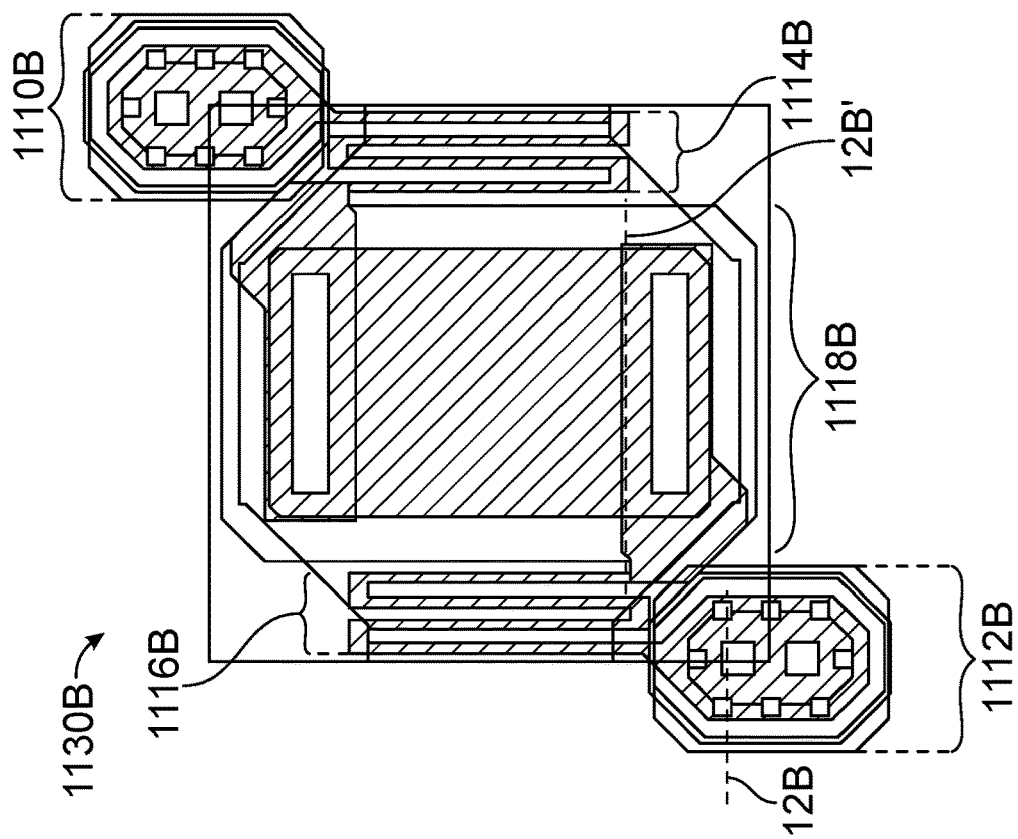
FIG. 11 illustrates a top view of infrared sensors with one having a lower absorption layer in a material-under-pixel (MUP) arrangement in accordance with an embodiment of the disclosure.
Figure 11:
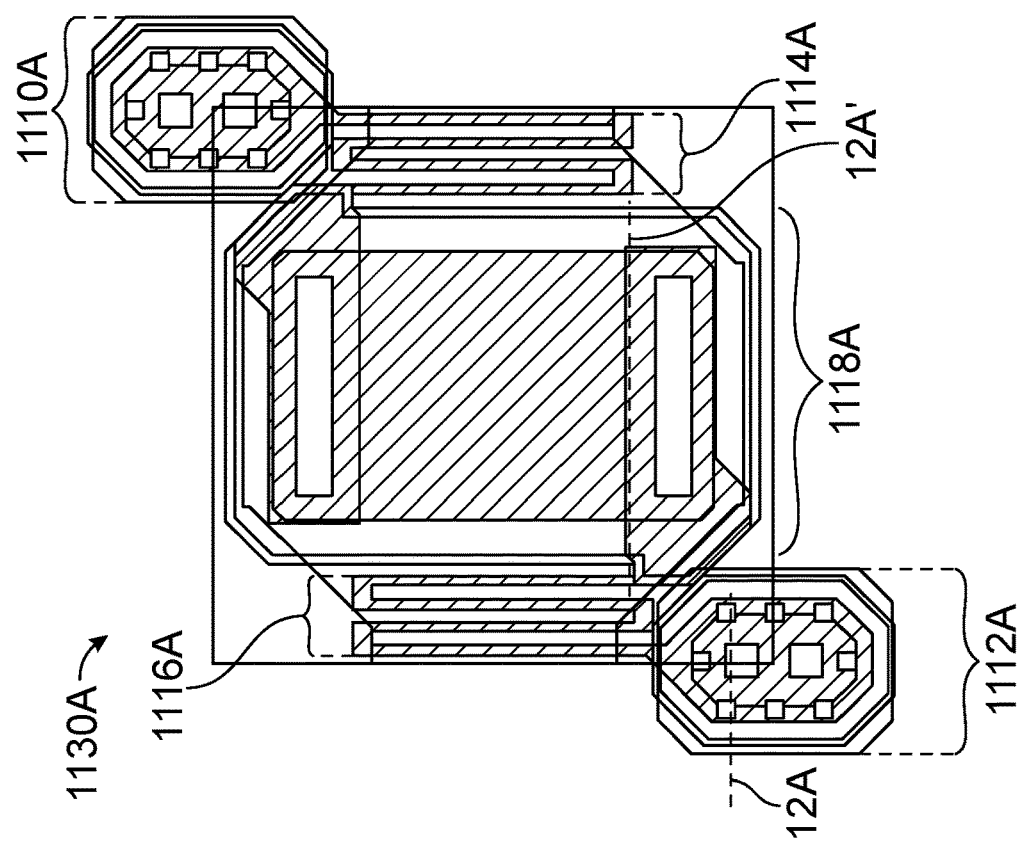
Figure 12:
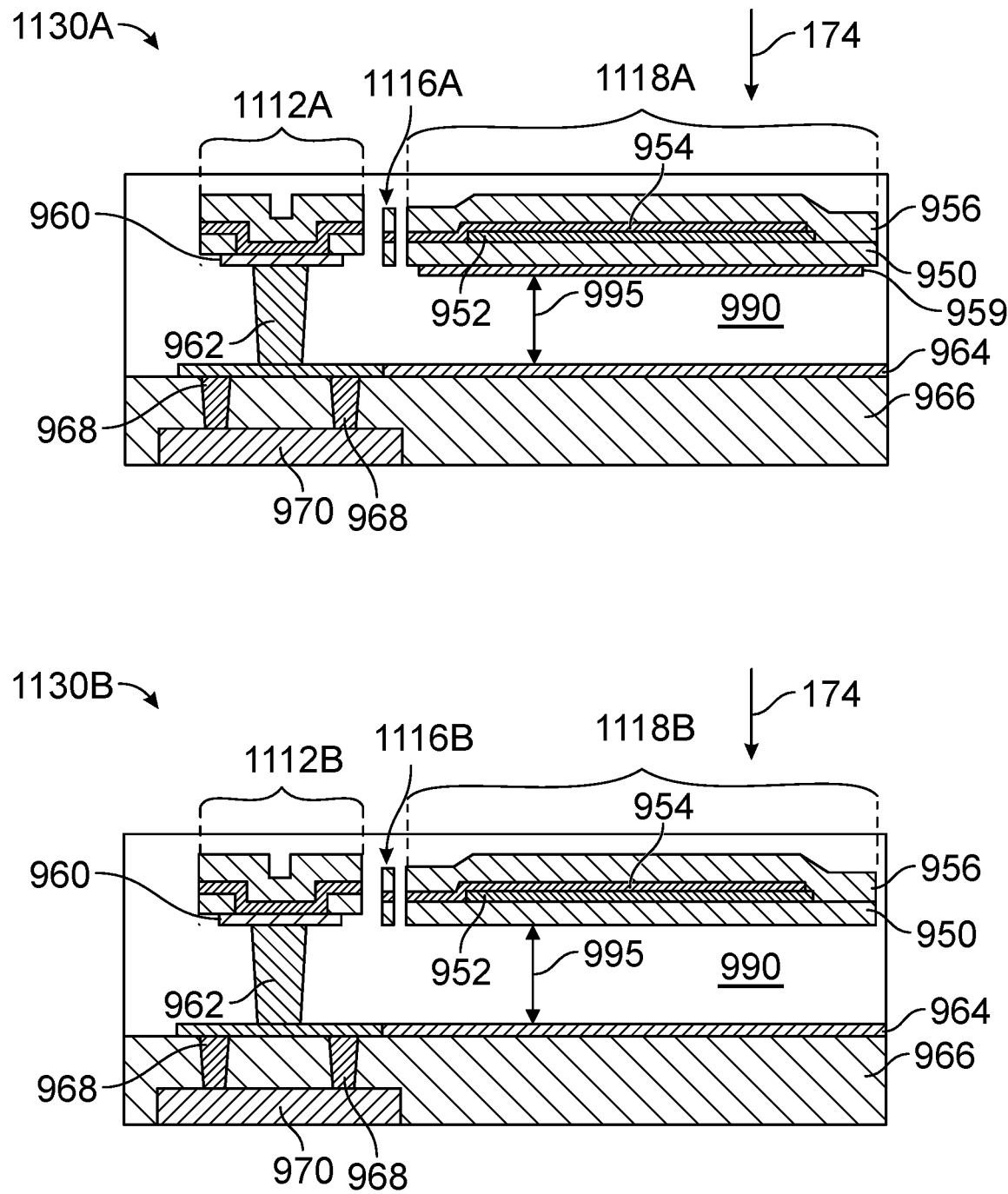
FIG. 12 illustrates a cross-sectional view of infrared sensors taken at lines 12A/12A' and 12B/12B' of FIG. 11 in accordance with an embodiment of the disclosure.

FIG. 11 illustrates a top view of infrared sensors 1130A and 1130B with infrared sensor 1130A having a lower absorption layer in a material-under-pixel (MUP) arrangement in accordance with an embodiment of the disclosure. As similarly discussed with regard to FIGS. 9-10, infrared sensors 1130A and 1130B are positioned adjacent to each other and used to implement individual ones of infrared sensors 230A and 230B, respectively, as part of sensor array 228. FIG. 12 illustrates cross-sectional views of infrared sensors 1130A and 1130B taken at lines 12A/12A' and 12B/12B' of FIG. 11 in accordance with an embodiment of the disclosure.

As shown, infrared sensors 1130A and 1130B may be microbolometers implemented with substantially similar structures and layers as discussed with regard to infrared sensors 930A and 930B, but with infrared sensor 1130A including an additional absorption layer 959 in a MUP arrangement. For example, infrared sensors 1130A/1130B include various contacts 1110A/1110B and 1112A/1112B, legs 1114A/1114B and 1116A/1116B, and bridges 1118A/1118B.

Accordingly, infrared sensors 1130A and 1130B may be operated in a substantially similar manner as infrared sensors 930A and 930B, respectively, but with additional absorption layer 959 provided in infrared sensor 1130A below absorption layer 952 (e.g., instead of additional absorption layer 958 provided above absorption layer 952 as in infrared sensor 930A).

In this regard, the presence of additional absorption layer 959 in infrared sensor 1130A may affect the resistance exhibited by primary absorption layer 952 as similarly discussed with regard to infrared sensor 930A. In this regard, additional absorption layer 959 may cause infrared sensor 1130A to be responsive in one or more gas bands to provide a gas pixel. In addition, the position, thickness, and/or material of additional absorption layer 959 may be adjusted in relation to the other various layers and components of infrared sensor 1130A to select a desired spectral response for infrared sensor 1130A that corresponds to a gas band of interest. Various materials may be used for additional absorption layer 959 and other layers of infrared sensor 1130A as similarly discussed with regard to additional absorption layer 958 and other layers.

Moreover, in some embodiments, the presence of additional absorption layer 959 in infrared sensor 1130A may reduce the height 995 of optical cavity 990 in comparison, for example, to that of other infrared sensors discussed herein. As a result, the spectral response of infrared sensor 930A may be shifted or extended, for example, to a gas band as may be desired for particular implementations. Moreover, because additional absorption layer 959 is adjacent to optical cavity 990, it may have more of an effect on the dimensions of optical cavity 990 than the additional absorption layer 958 of FIGS. 9 and 10.

Figure 13:
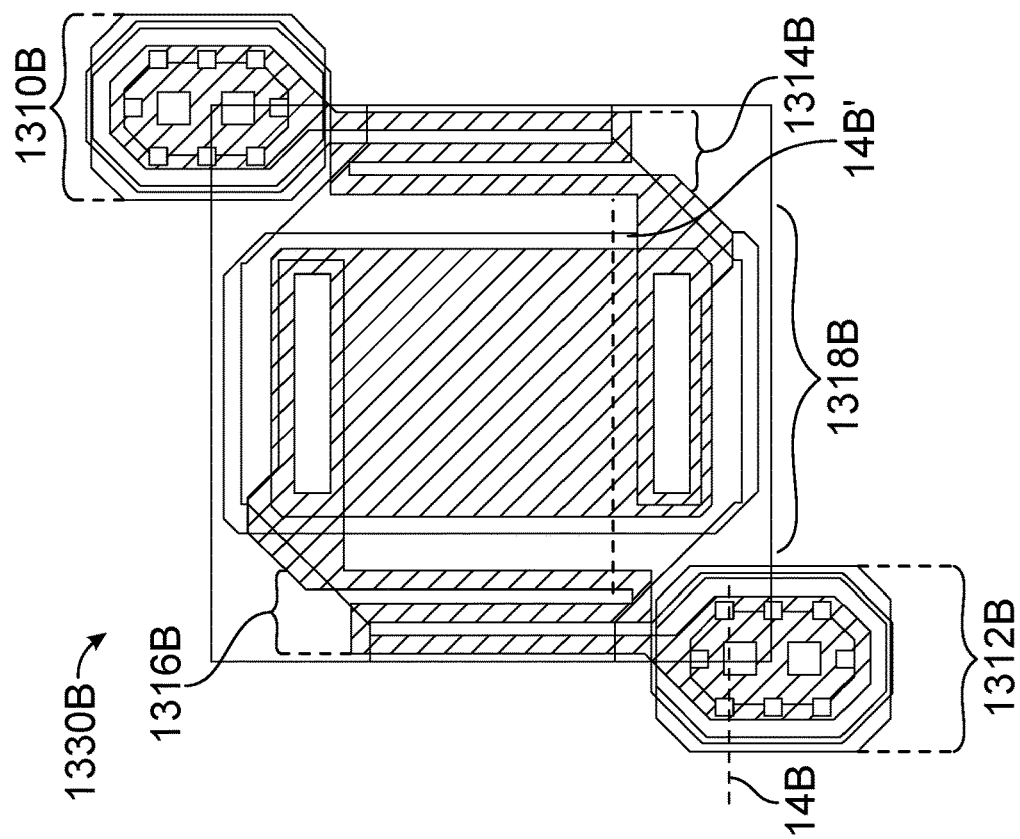
FIG. 13 illustrates a top view of infrared sensors with different leg and bridge configurations in accordance with an embodiment of the disclosure.
Figure 13:
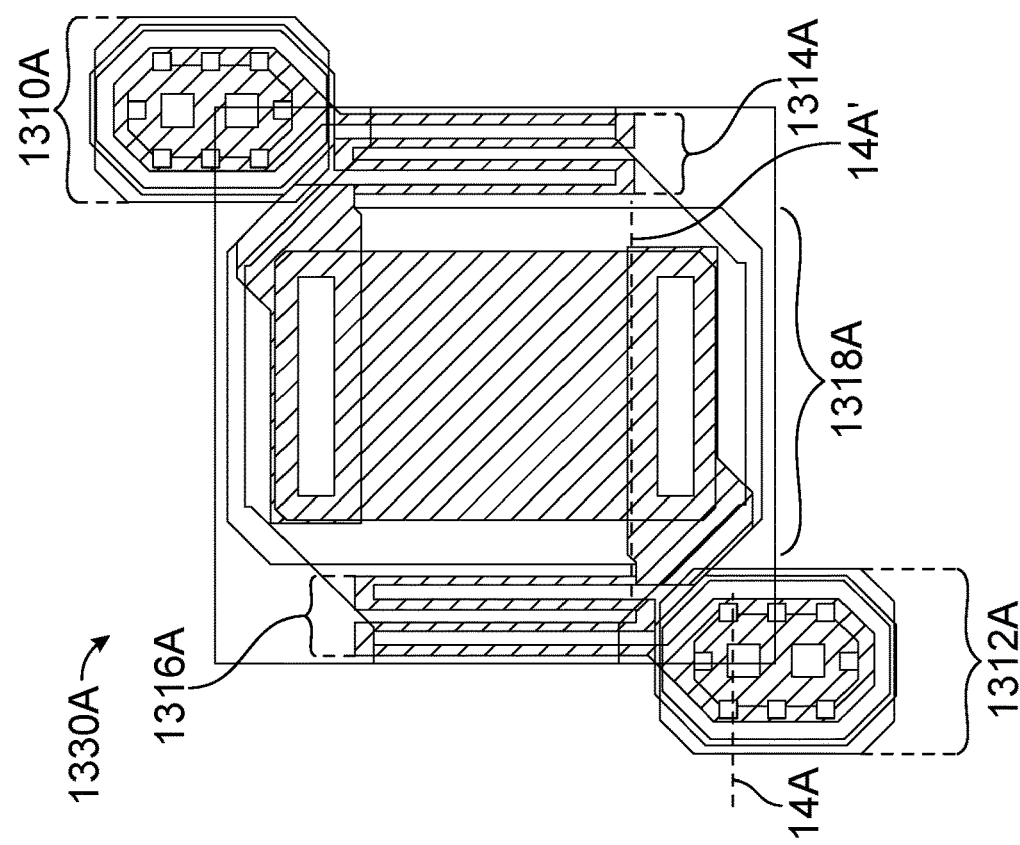
Figure 14:
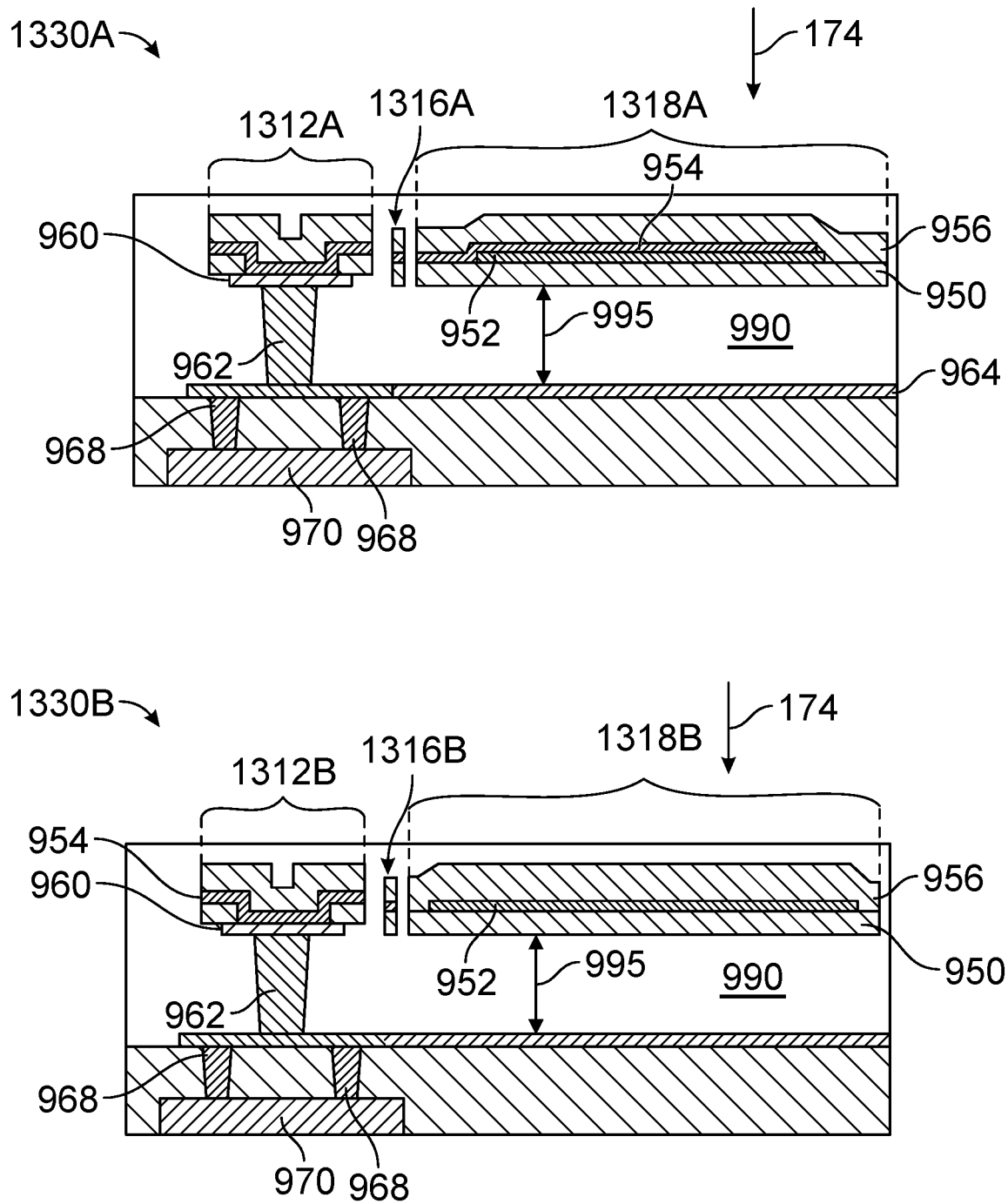
FIG. 14 illustrates a cross-sectional view of infrared sensors taken at lines 14A/14A' and 14B/14B' of FIG. 13 in accordance with an embodiment of the disclosure.

FIG. 13 illustrates a top view of infrared sensors 1330A and 1330B with different leg and bridge configurations. As similarly discussed with regard to FIGS. 9-12, infrared sensors 1330A and 1330B are positioned adjacent to each other and used to implement individual ones of infrared sensors 230A and 230B, respectively, as part of sensor array 228. FIG. 14 illustrates cross-sectional views of infrared sensors 1330A and 1330B taken at lines 14A/14A' and 14B/14B' of FIG. 13 in accordance with an embodiment of the disclosure.

As shown, infrared sensors 1330A and 1330B may be microbolometers implemented with substantially similar structures and layers as discussed with regard to infrared sensors 930A/1130A and 930B/1130B. For example, infrared sensors 1330A/1330B include various contacts 1310A/1310B and 1312A/1312B, legs 1314A/1314B and 1316A/1316B, and bridges 1318A/1318B.

However, infrared sensors 1330A and 1330B are provided without additional absorption layer 958 or 959. Also, infrared sensor 1330B is implemented with a modified configuration of bridge 1318B and legs 1314B/1316B in comparison with bridge 1318A and legs 1314A/1316A of infrared sensor 1330A. In this regard, infrared sensor 1330B exhibits a different fillfactor and a different leg geometry.

In particular, bridge 1318B is implemented as a smaller bridge. For example, as shown in FIG. 14, insulating layers 950 and 956 of infrared sensor 1330B have a reduced size in comparison with those of infrared sensor 1330A (metal layer 954 is also included in bridge 1318B but does not extend into the cross section denoted by line 14B). As a result, the smaller bridge 1318B of infrared sensor 1330B will exhibit a reduced thermal mass and retain less heat than the larger bridge 1318A of infrared sensor 1330A. This can result in a reduced output signal (e.g., reduced gain associated with reduced current) provided by infrared sensor 1330B (e.g., caused by primary absorption layer 952 exhibiting a smaller change in resistance due to the reduced heat retention) in comparison to that of infrared sensor 1330A receiving the same bias voltage and the same filtered infrared radiation 174.

In some embodiments, this reduced output signal associated with infrared sensor 1330B may be advantageously used to help balance the output signals of infrared sensors 1330A and 1330B if infrared sensor 1330A is configured to have a wider spectral response (e.g., extending to a gas band through the implementation of one or more additional absorption layers 958/959 in infrared sensor 1330A as discussed with regard to infrared sensors 930A/1130A and/or other configurations).

For example, if infrared sensors 1330A and 1330B are responsive to an overlapping range of wavelengths, but with infrared sensor 1330A being further responsive to an additional range of wavelengths, then the proportion of the output signal provided by infrared sensor 1330A associated with the overlapping wavelengths may be smaller than that of infrared sensor 1330B. In this regard, only a portion of the output signal associated infrared sensor 1330A will be associated with the overlapping wavelengths, while the entirety of the output signal associated infrared sensor 1330B will be associated with the overlapping wavelengths. Accordingly, by providing infrared sensor 1330B with a smaller bridge 1318B as discussed, its associated output signal may be adjusted (e.g., reduced) in a manner to be proportionate to the output signal provided by infrared sensor 1330A for the same overlapping wavelengths, for example, to balance the output signals of infrared sensors 1330A and 1330B.

As also shown, legs 1314B/1316B may be implemented with a shorter length and/or a greater width in comparison with legs 1314A/1316A. In some embodiments, such configurations may permit legs 1314B/1316B to radiate more heat and may exhibit reduced thermal isolation in comparison with legs 1314A/1316A. These configurations may be used to adjust (e.g., reduce) the output signal provided by infrared sensor 1330B to balance it in relation to the output signal provided by infrared sensor 1330A.

Although particular implementations have been discussed in relation to infrared sensors 930A/930B, 1130A/1130B, and 1330A/1330B, any of these implementations may be combined with each other as appropriate. For example, any of the various configurations of additional absorption layers, legs, and/or bridges may be combined together as desired to implement infrared sensors 230A/230B with desired spectral responses corresponding to gas or no-gas pixels and/or desired output signal characteristics.

Figure 15:
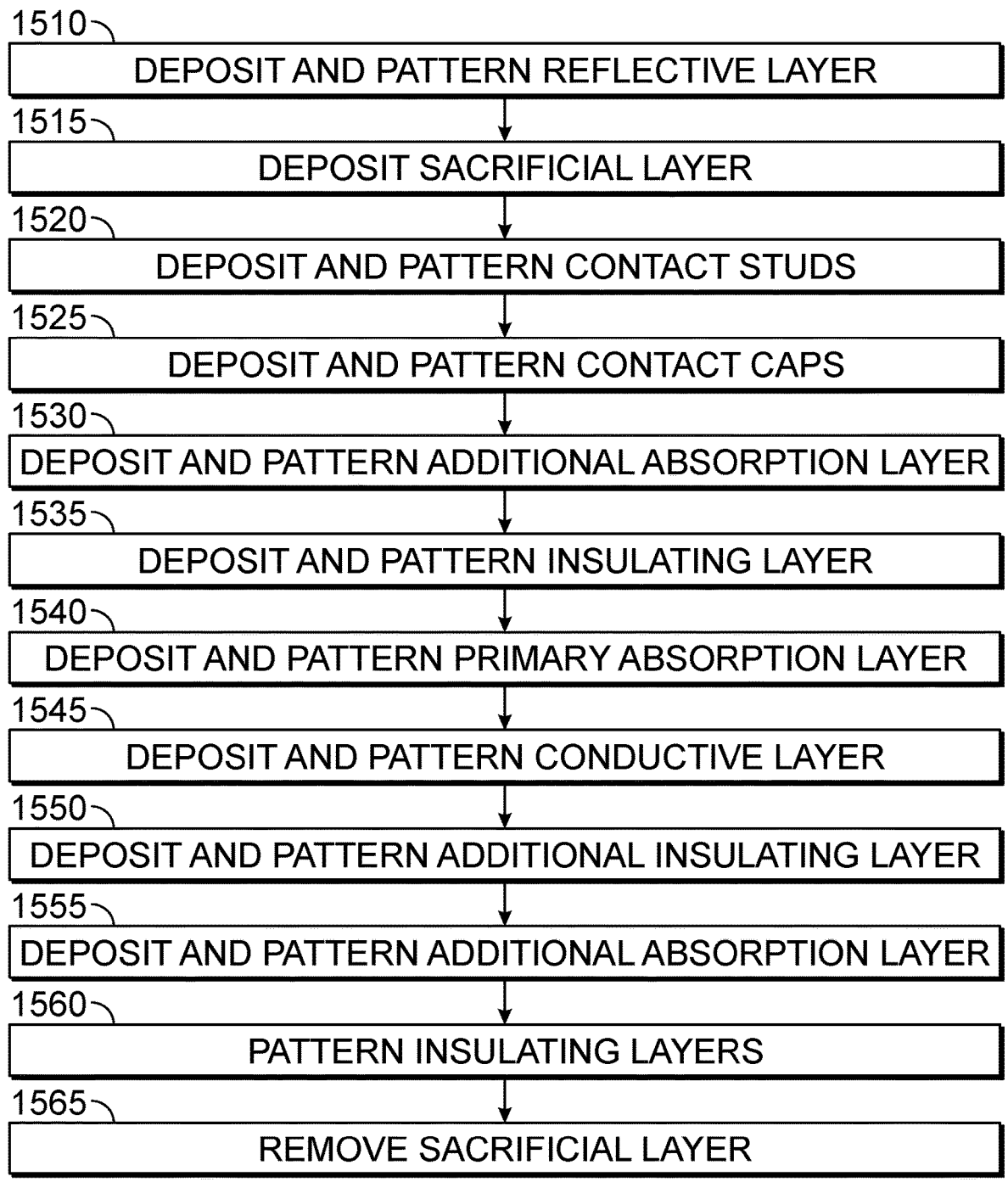
FIG. 15 illustrates a manufacturing process for infrared sensors in accordance with an embodiment of the disclosure.

Various techniques may be used to manufacture the different embodiments of infrared sensors 230 discussed herein. For example, FIG. 15 illustrates a manufacturing process for infrared sensors 230A and 230B, and FIGS. 16-27 further illustrate various operations of the manufacturing process in accordance with embodiments of the disclosure. Although FIGS. 15-27 refer generally to infrared sensor 930A, it will be understood that the discussed techniques may be used in the manufacture of any of the infrared sensor implementations provided herein. Moreover, in some embodiments, the described operations may be used to manufacture all infrared sensors 230 of array 228, or portions thereof, simultaneously.

Figure 16:
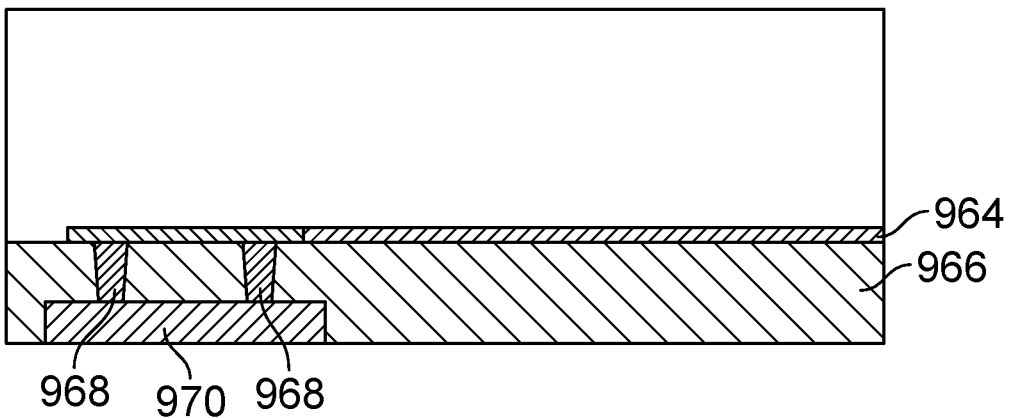
FIGS. 16-27 illustrate various operations of a manufacturing process for infrared sensors in accordance with embodiments of the disclosure.
Figure 17:
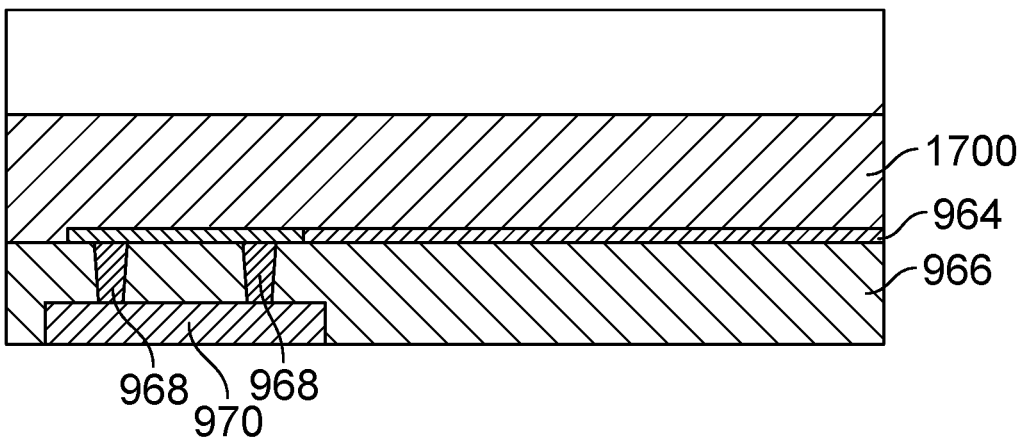
Figure 18:
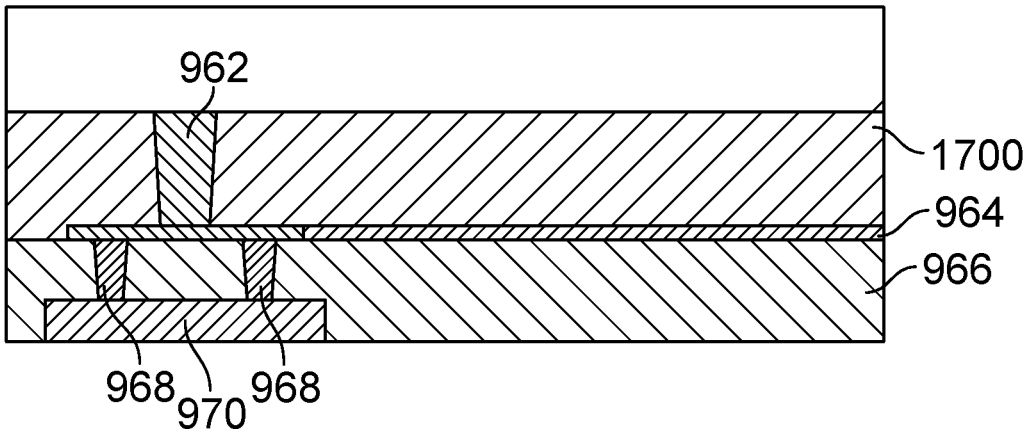
Figure 19:
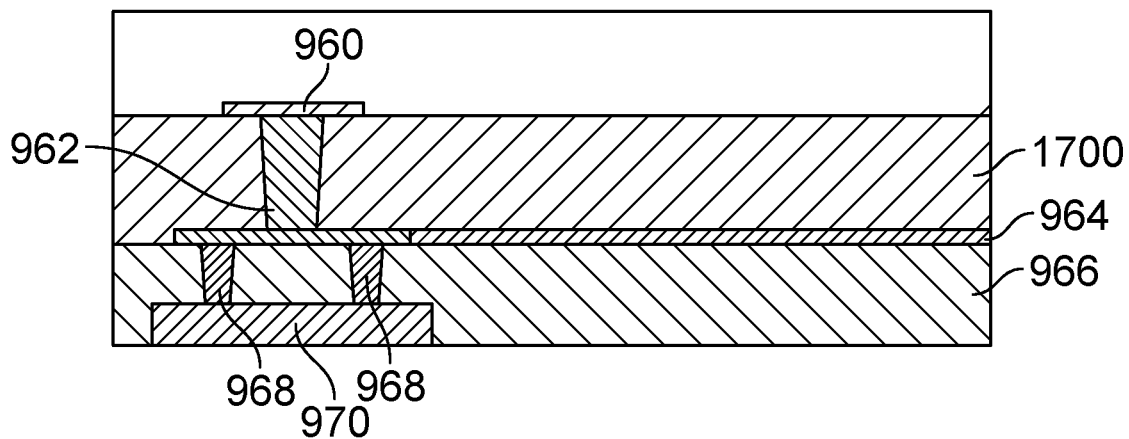

In block 1510, reflective layer 964 is deposited and patterned on substrate 966 which includes various additional components such as vias 968 and circuitry 970 of ROIC 202 (see FIG. 16). In block 1515, a sacrificial layer 1700 is deposited (see FIG. 17). In block 1520, contact studs 962 are deposited and patterned (see FIG. 18). In block 1525, contact caps 960 are deposited and patterned (see FIG. 19).

Figure 20:
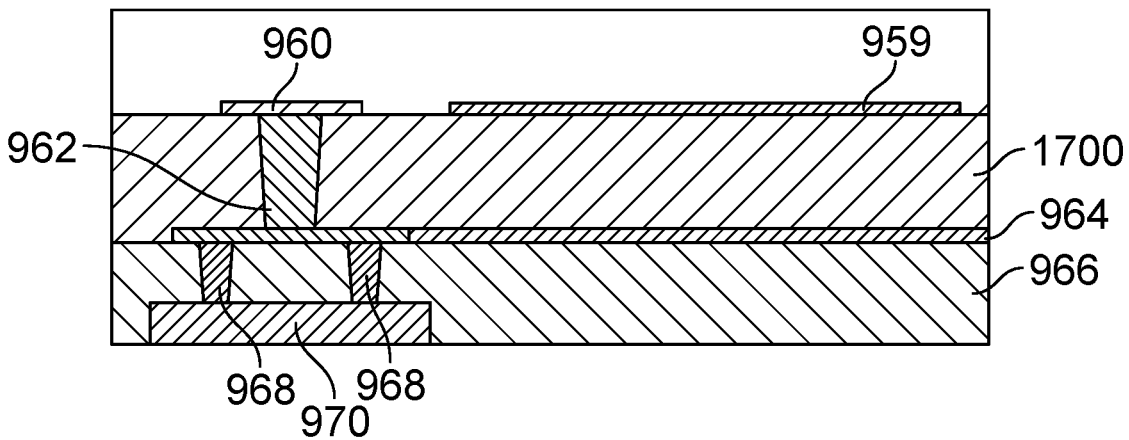

In block 1530, for infrared sensors implemented with a MUP configuration (e.g., as illustrated by infrared sensor 1130A), additional absorption layer 959 is deposited and patterned (see FIG. 20). Various configurations of additional absorption layer 959 may be used to adjust the spectral response of infrared sensor 1130A. For example, in some embodiments, additional absorption layer 959 may be approximately 600 angstroms thick, however other thicknesses are also contemplated. Although additional absorption layer 959 is not shown in the remaining FIGS. 21-27, it may be retained as desired for various embodiments.

Figure 21:
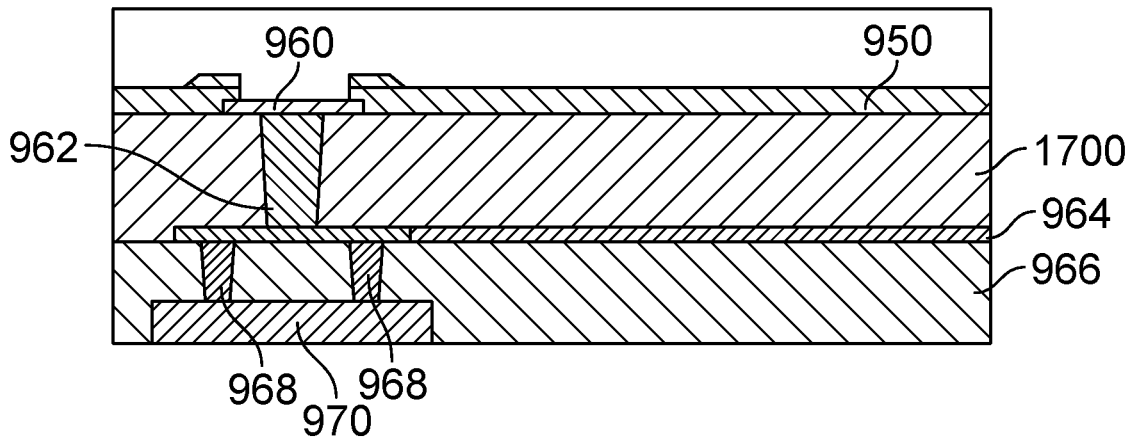
Figure 22:
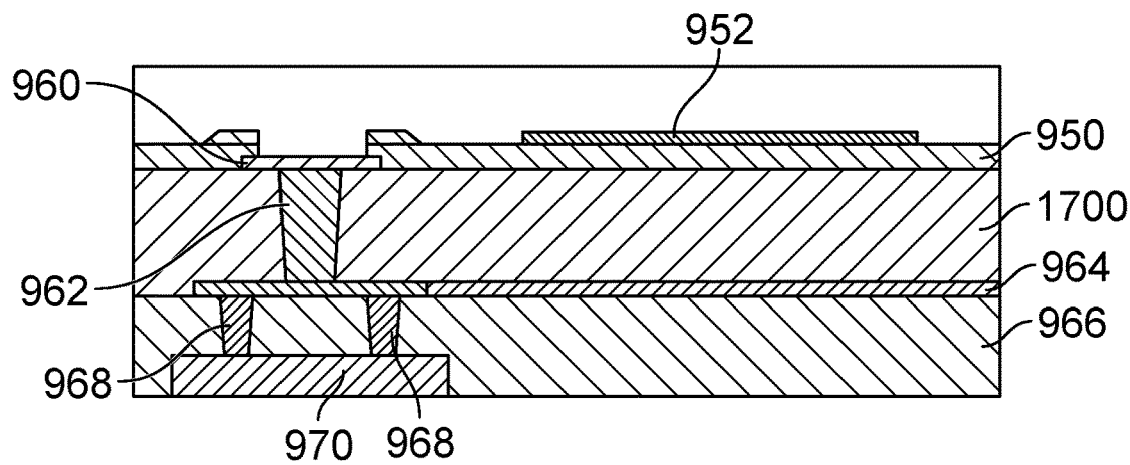
Figure 23:
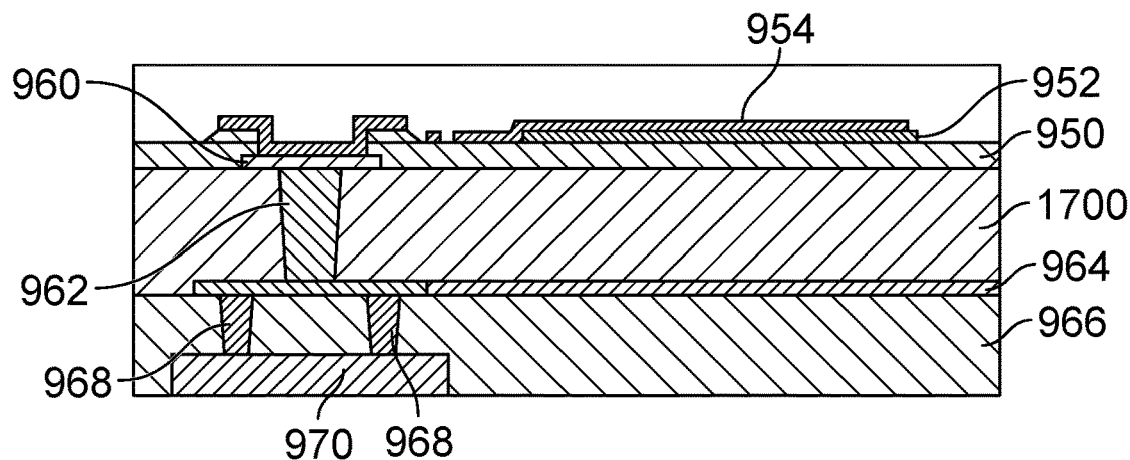
Figure 24:
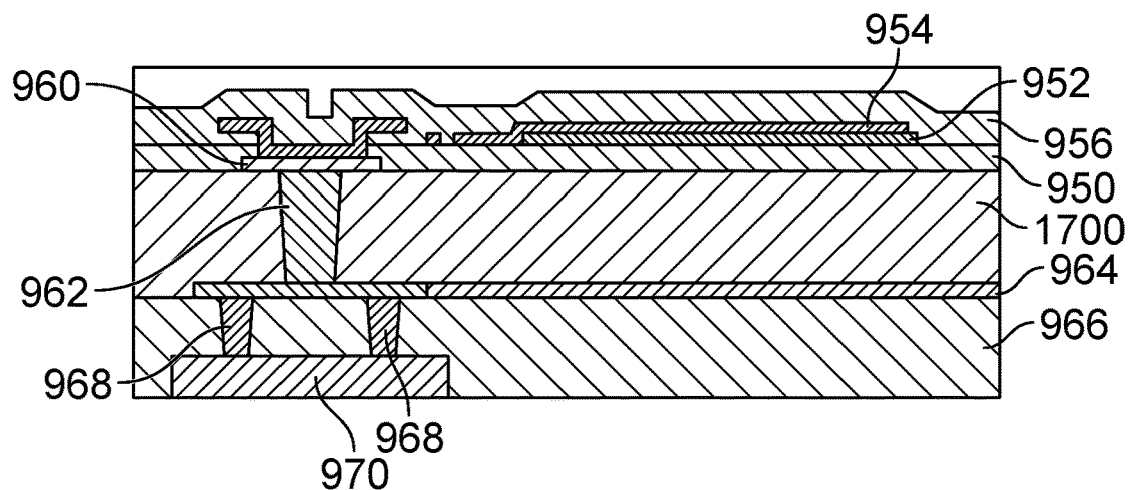

In block 1535, insulating layer 950 is deposited and patterned (see FIG. 21). In block 1540, primary absorption layer 952 is deposited and patterned (see FIG. 22). In block 1545, conductive layer 954 is deposited and patterned (see FIG. 23). In block 1550, additional insulating layer 956 is deposited and patterned (see FIG. 24).

Figure 25:
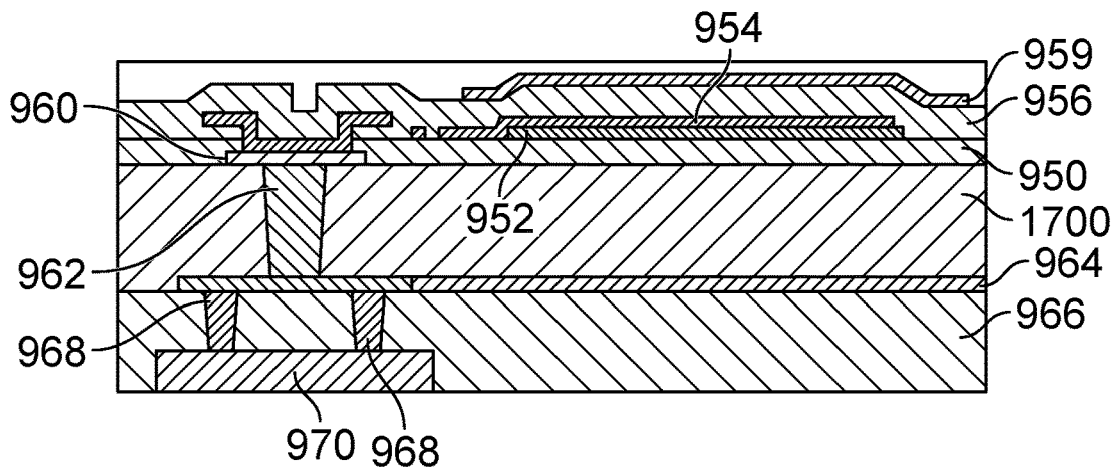

In block 1555, for infrared sensors implemented with a MOP configuration (e.g., as illustrated by infrared sensor 930A), additional absorption layer 958 is deposited and patterned (see FIG. 25). Various configurations of additional absorption layer 958 may be used to adjust the spectral response of infrared sensor 930A. For example, in some embodiments, additional absorption layer 958 may be approximately 600 angstroms thick, however other thicknesses are also contemplated. Although additional absorption layer 958 is not shown in the remaining FIGS. 26-27, it may be retained as desired for various embodiments.

Figure 26:
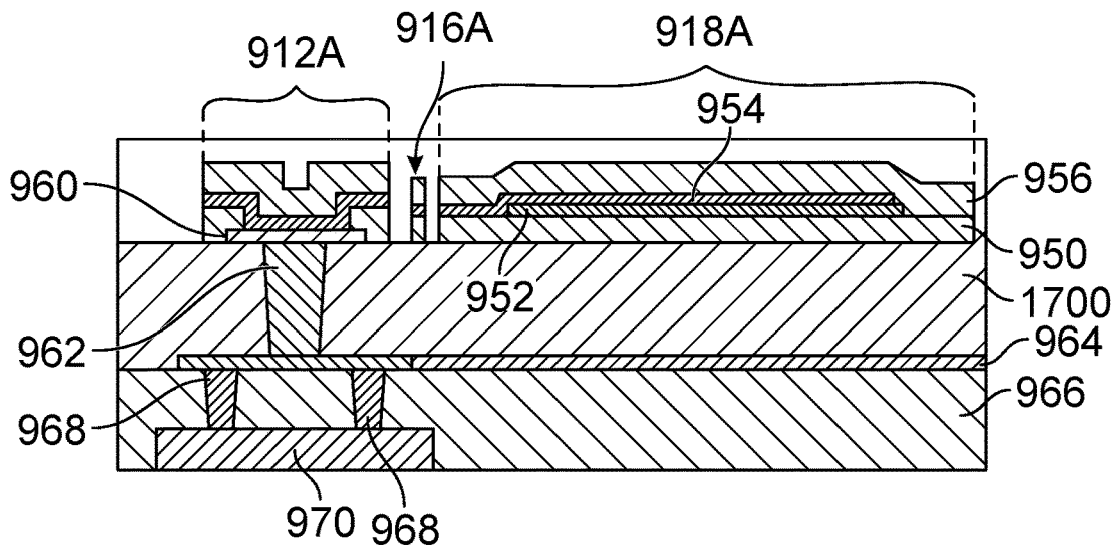

In block 1560, insulating layers 950 and 956 are patterned to define the shape of contacts, legs, and bridges (see FIG. 26 illustrating one example contact 912A, leg 916A, and bridge 918A). In some embodiments, this may include the modified leg and/or bridge configurations for different infrared sensors as discussed.

Figure 27:
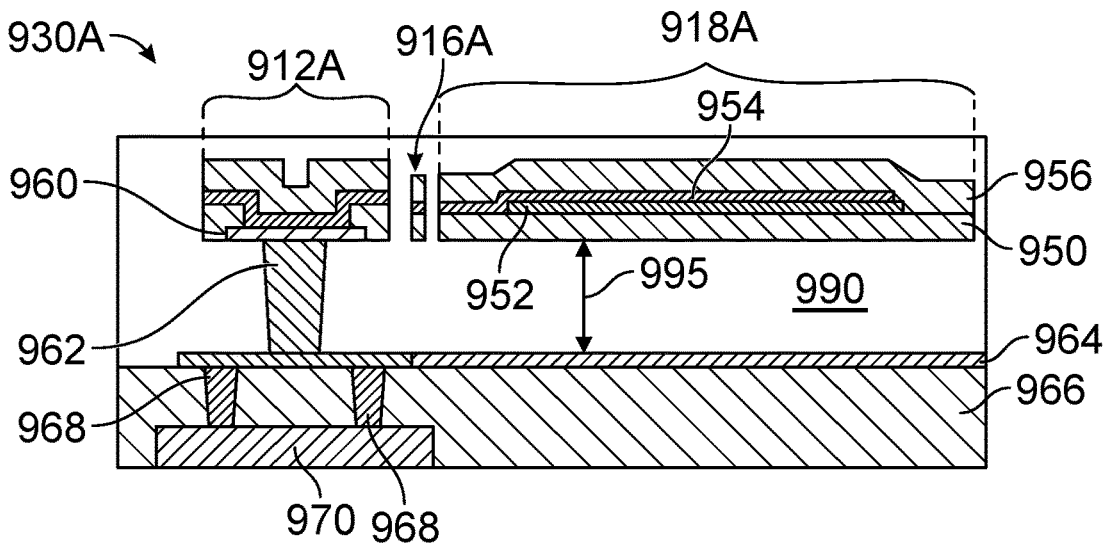

In block 1565, sacrificial layer 1700 is removed to reveal optical cavity 990 which results in the bridges remaining suspended above reflective layer 964 and substrate 966 by height 995 (see FIG. 27). As previously noted, additional absorption layers 958 and 959 are not shown in FIG. 27 but may be provided in accordance with various embodiments. Thereafter, additional manufacturing operations may be performed such as, for example, the provisioning of additional circuitry, packaging operations, and/or other operations to complete the manufacture of sensor array 228.

Thus, following the process of FIG. 15, a completed sensor array 228 may be provided having different sets of infrared sensors 230A and 230B that are responsive to different wavelengths. As a result, gas and no-gas images may be captured using the same sensor array 228 and further processed to perform gas detection.

Although various physical configurations of infrared sensors 230A and 230B have been described which implement different spectral response patterns, other embodiments are also contemplated. For example, one or more filters implemented by photo masks, substrates, coatings, and/or other materials may be positioned in front of infrared sensors 230A and 230B to filter infrared radiation 171 such that infrared sensors 230A and 230B receive filtered infrared radiation corresponding to desired spectral response patterns. In some embodiments, such filters may be provided with an FPA implemented with a uniform set of infrared sensors 230 (e.g., without different physical configurations provided among infrared sensors 230A and 230B). In other embodiments, such filters may be provided with an FPA implemented with one or more of the physical configurations of infrared sensors 230A and 230B discussed herein. In some embodiments, such filters may implemented in addition to full array filter 133. In other embodiments, such filters may effectively implement the filtering performed by full array filter 133, thus permitting full array filter 133 to be omitted. In some embodiments, any of the filters contemplated herein may be implemented in accordance with those set forth in International Patent Application No. PCT/US2017/064759 filed Dec. 5, 2017 which is incorporated herein by reference in its entirety.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a sensor array configured to receive infrared radiation from a scene comprising a background portion and a gas, the sensor array comprising:
a first set of infrared sensors configured with a first spectral response corresponding to a first wavelength range of the infrared radiation associated with the background portion, and
a second set of infrared sensors configured with a second spectral response corresponding to a second wavelength range of the infrared radiation associated with the gas;
a read out integrated circuit (ROIC) configured to provide pixel values for first and second images captured by the first and second sets of infrared sensors, respectively, in response to the received infrared radiation; and
wherein the infrared sensors are microbolometers each comprising a bridge, wherein the bridges of the first set of infrared sensors have a reduced thermal mass in relation to the bridges of the second set of infrared sensors to balance signals provided by the first and second sets of infrared sensors to the ROIC for the first and second images.

2. The system of claim 1, wherein:
each bridge comprises a primary absorption layer configured to exhibit a change in resistance in response to infrared radiation received by the bridge; and
the second set of infrared sensors each further comprise an additional absorption layer in the bridge to extend the second wavelength range to include the infrared radiation associated with the gas.

3. The system of claim 2, wherein the additional absorption layer is positioned relative to the primary absorption layer in a material-on-pixel (MOP) or a material-under-pixel (MUP) arrangement, wherein the first and second sets of infrared sensors comprise optical cavities of different first and second dimensions, respectively.

4. The system of claim 1, wherein the microbolometers each further comprise:
contacts in electrical communication with the ROIC;
legs connecting the contacts with the bridge; and
wherein the legs of the first set of infrared sensors have a reduced length in relation to the legs of the second set of infrared sensors to balance signals provided by the first and second sets of infrared sensors to the ROIC for the first and second images.

5. The system of claim 1, wherein the first and second sets of infrared sensors are arranged in an alternating checkerboard pattern or an alternating column pattern.

6. The system of claim 1, wherein the second wavelength range overlaps the first wavelength range.

7. The system of claim 1, further comprising a filter interposed between the sensor array and the scene and configured to remove a third wavelength range of the infrared radiation before it is received by the sensor array, wherein the third wavelength range overlaps the first and second wavelength ranges.

8. The system of claim 1, wherein the sensor array is configured to capture the first and second images simultaneously.

9. The system of claim 1, further comprising a logic circuit configured to process the first and second images to identify the gas.

10. A method comprising:
receiving, at a sensor array, infrared radiation from a scene comprising a background portion and a gas;
capturing a first image by a first set of infrared sensors of the sensor array configured with a first spectral response corresponding to a first wavelength range of the infrared radiation associated with the background portion;
capturing a second image by a second set of infrared sensors of the sensor array configured with a second spectral response corresponding to a second wavelength range of the infrared radiation associated with the gas;
providing, by a read out integrated circuit (ROIC), pixel values for the first and second images; and
wherein the infrared sensors are microbolometers each comprising a bridge, wherein the bridges of the first set of infrared sensors have a reduced thermal mass in relation to the bridges of the second set of infrared sensors to balance signals provided by the first and second sets of infrared sensors to the ROIC for the first and second images.

11. The method of claim 10, wherein:
each bridge comprises a primary absorption layer configured to exhibit a change in resistance in response to infrared radiation received by the bridge; and the second set of infrared sensors each further comprise an additional absorption layer in the bridge to extend the second wavelength range to include the infrared radiation associated with the gas.

12. The method of claim 10, wherein the microbolometers each further comprise:
   contacts in electrical communication with the ROIC;
   legs connecting the contacts with the bridge; and
   wherein the legs of the first set of infrared sensors have a reduced length in relation to the legs of the second set of infrared sensors to balance signals provided by the first and second sets of infrared sensors to the ROIC for the first and second images.

13. The method of claim 10, further comprising filtering the infrared radiation to remove a third wavelength range before the infrared radiation is received by the sensor array, wherein the third wavelength range overlaps the first and second wavelength ranges.

14. The method of claim 10, further comprising processing the first and second images to identify the gas.

15. A method comprising:
   depositing and patterning contacts for first and second sets of infrared sensors of a sensor array;
   depositing and patterning a primary absorption layer for a bridge of each of the infrared sensors;
   depositing and patterning an additional absorption layer for the bridges of the second set of infrared sensors;
   depositing and patterning an insulating layer for the bridges of the first and second sets of infrared sensors;
   wherein the first set of infrared sensors are configured by the primary absorption layer to exhibit a first spectral response corresponding to a first wavelength range of infrared radiation associated with a background portion of a scene;
   wherein the second infrared sensors are configured by the primary absorption layer and the additional absorption layer to exhibit a second spectral response corresponding to a second wavelength range of infrared radiation associated with a gas in the scene; and
   wherein the insulating layer of the first set of infrared sensors has a reduced thermal mass in relation to the insulating layer of the second set of infrared sensors to balance signals provided by the first and second sets of infrared sensors to a read out integrated circuit (ROIC) configured to provide pixel values for first and second images captured by the first and second sets of infrared sensors, respectively, in response to the received infrared radiation.

16. The method of claim 15, further comprising depositing and patterning a metal layer for legs connecting the contacts of each of the infrared sensors with its associated bridge, wherein the legs of the first set of infrared sensors have a reduced length in relation to the legs of the second set of infrared sensors to balance signals provided by the first and second sets of infrared sensors.

17. The method of claim 15, further comprising providing a filter interposed between the sensor array and the scene and configured to remove a third wavelength range of the infrared radiation before it is received by the sensor array, wherein the third wavelength range overlaps the first and second wavelength ranges.

* * * * *